US012214330B2

(12) United States Patent
Lackner et al.

(10) Patent No.: US 12,214,330 B2
(45) Date of Patent: Feb. 4, 2025

(54) ENHANCED CAPTURE STRUCTURES FOR DIRECT AIR CAPTURE

(71) Applicants: Klaus Lackner, Paradise Valley, AZ (US); Robert Page, Phoenix, AZ (US); John Cirucci, Scottsdale, AZ (US); Matthew Green, Phoenix, AZ (US); Thiago Stangherlin Barbosa, Chandler, AZ (US)

(72) Inventors: Klaus Lackner, Paradise Valley, AZ (US); Robert Page, Phoenix, AZ (US); John Cirucci, Scottsdale, AZ (US); Matthew Green, Phoenix, AZ (US); Thiago Stangherlin Barbosa, Chandler, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 364 days.

(21) Appl. No.: 17/729,296

(22) Filed: Apr. 26, 2022

(65) Prior Publication Data
US 2022/0339603 A1    Oct. 27, 2022

Related U.S. Application Data

(60) Provisional application No. 63/179,742, filed on Apr. 26, 2021.

(51) Int. Cl.
*B01D 39/16*    (2006.01)
*B01D 46/00*    (2022.01)
(Continued)

(52) U.S. Cl.
CPC ........ *B01J 20/28014* (2013.01); *B01D 39/16* (2013.01); *B01D 46/00* (2013.01); *B01D 53/02* (2013.01); *B01D 53/04* (2013.01); *B01D 53/0407* (2013.01); *B01J 20/28011* (2013.01); *B01J 20/28045* (2013.01);
(Continued)

(58) Field of Classification Search
CPC .... B01D 53/02; B01D 53/0407; B01D 39/16; B01D 46/00
See application file for complete search history.

(56) References Cited

U.S. PATENT DOCUMENTS 10,960,341 B2 *   3/2021   Wendland .......... B01D 39/1623
2022/0339603 A1   10/2022  Lackner et al.

* cited by examiner

*Primary Examiner* — Robert A Hopkins
(74) *Attorney, Agent, or Firm* — Booth Udall Fuller, PLC

(57) ABSTRACT

An enhanced capture structure is disclosed, including a sorbent structure having a $CO_2$ sorbent material. The capture structure also includes a plurality of barriers extending outward from the sorbent structure, each sized and positioned such that as an airflow passes along the sorbent structure, a high pressure region forms proximate the sorbent structure on a first side of the barrier facing into the airflow and a low pressure region forms proximate the sorbent structure on a second side of the barrier facing away from the airflow. The barriers on one side of the sorbent structure are staggered with respect to barriers on the other side such that a plurality of high and low pressure regions are formed, each high pressure region being formed opposite a low pressure region on the other side of the structure, creating a pressure differential that promotes $CO_2$ mass transfer into the sorbent material via convection.

16 Claims, 16 Drawing Sheets

(51) Int. Cl.
*B01D 53/02* (2006.01)
*B01D 53/04* (2006.01)
*B01J 20/28* (2006.01)
(52) U.S. Cl.
CPC ....... *B01J 20/2805* (2013.01); *B01D 2253/34* (2013.01); *B01D 2257/504* (2013.01)

ENHANCED CAPTURE STRUCTURES FOR DIRECT AIR CAPTURE

RELATED APPLICATIONS

This application claims the benefit of U.S. provisional patent application 63/179,742, filed Apr. 26, 2021 titled "Sorbent Structures for Direct Air Capture," the entirety of the disclosure of which is hereby incorporated by this reference.

TECHNICAL FIELD

Aspects of this document relate generally to structures for direct air capture using a sorbent.

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk.

A promising technology that is well adapted for capturing dilute atmospheric carbon dioxide in an energy efficient manner is passive direct air capture, or passive DAC, which is distinguished from other DAC technologies which require additional energy for the forced convection of air. Air contactor surfaces that comprise sorbent materials are exposed to passive atmospheric air flows, capturing carbon dioxide with the sorbent material to be released within an appropriate context for further processing, use, and/or storage. In some passive DAC solid sorbent contactors in which the sorbent is presented in horizontal planes with native wind flow through open gaps between these planes, $CO_2$ mass transfer into the sorbent occurs by diffusion vertically, perpendicular to the wind direction. Diffusion is much slower than convection.

In many cases, it may be advantageous to induce some turbulence across the capture surfaces so as to enhance transport into the depth of the sorbent material. In general, it is advantageous to create surface roughness that is designed to disrupt air side boundary layers and maximize transport of $CO_2$ to the surface itself. This is relevant for any solid sorbent direct air capture system, but particularly important for passive systems relying on wind as the air motive force. However, surface characteristics which create turbulence also increase pressure drop and reduce air flow, which has the negative effect of reducing the amount of $CO_2$ presented to the sorbent.

SUMMARY

According to one aspect, an enhanced capture structure includes a sorbent structure having a first $CO_2$ sorbent material, the sorbent structure further includes a first surface and a second surface opposite the first surface. The enhanced capture structure also includes a plurality of barriers extending outward from the sorbent structure, each barrier of the plurality of barriers sized and positioned such that as an airflow passes along the sorbent structure and over the barrier a high pressure region forms proximate the sorbent structure on a first side of the barrier facing into the airflow and a low pressure region forms proximate the sorbent structure on a second side of the barrier facing away from the airflow, opposite the first side. The plurality of barriers includes a first set of barriers extending outward from the first surface of the sorbent structure and a second set of barriers extending outward from the second surface of the sorbent structure. The first set of barriers is staggered with respect to the second set of barriers such that the airflow creates a plurality of high pressure regions and a plurality of low pressure regions proximate the sorbent structure, where each high pressure region formed proximate one of the first surface and the second surface of the sorbent structure is opposite a low pressure region formed on the other of the first surface and the second surface of the sorbent structure, creating a pressure differential that promotes $CO_2$ mass transfer into the first sorbent material via convection through the sorbent structure.

Particular embodiments may comprise one or more of the following features. Each barrier of the plurality of barriers passes through at least a majority of the sorbent structure. Each barrier of the plurality of barriers may be coupled to one of the first surface and the second surface. The enhanced capture structure may also include a rotational symmetry about an axis normal to the first surface and the second surface of the sorbent structure. The enhanced capture structure may also include a translational symmetry in a direction parallel to the first surface and the second surface of the sorbent structure. The sorbent structure may also include a support material having a first density, and the sorbent material may have a second density that may be less than the first density. The support material may be a second $CO_2$ sorbent material. The support material may be a tessellation of polygons forming polygonal conduits passing from the first surface to the second surface. Each polygonal conduit may be at least partially filled with the first $CO_2$ sorbent material. The polygonal conduits of the tessellation may each have a hexagonal cross section. Each barrier of the plurality of barriers may be integral with, and/or extend outward from, a different polygonal edge of the tessellation of polygons.

According to another aspect of the disclosure, an enhanced capture structure includes a sorbent structure that includes a first $CO_2$ sorbent material having a second density and a support material having a first density greater than the second density. The sorbent structure further includes a first surface and a second surface opposite the first surface. The support material is a tessellation of polygons forming polygonal conduits passing from the first surface to the second surface, each conduit including the first $CO_2$ sorbent material.

Particular embodiments may comprise one or more of the following features. The support material may be a second $CO_2$ sorbent material. The polygonal conduits of the tessellation may each have a hexagonal cross section. The enhanced capture structure may also include a rotational symmetry about an axis normal to the first surface and the second surface of the sorbent structure. The enhanced capture structure may also include a translational symmetry in a direction parallel to the first surface and the second surface of the sorbent structure. The enhanced capture structure may also include a plurality of barriers extending outward from the sorbent structure. Each barrier of the plurality of barriers may be sized and positioned such that as an airflow passes along the sorbent structure and over the barrier a high pressure region forms proximate the sorbent structure on a first side of the barrier facing into the airflow and a low pressure region forms proximate the sorbent structure on a second side of the barrier facing away from the airflow, opposite the first side. The plurality of barriers may include a first set of barriers extending outward from the first surface of the sorbent structure and a second set of barriers extending outward from the second surface of the sorbent structure. The first set of barriers and the second set of barriers may be staggered such that the airflow creates a plurality of high pressure regions and a plurality of low pressure regions proximate the sorbent structure. Each high pressure region may be formed proximate one of the first surface and the second surface of the sorbent structure may be opposite a low pressure region formed on the other of the first surface and the second surface of the sorbent structure, creating a pressure differential that promotes $CO_2$ mass transfer into the first sorbent material via convection through the sorbent structure. Each barrier of the plurality of barriers may pass through at least a majority of the sorbent structure. Each barrier of the plurality of barriers may be coupled to one of the first surface and the second surface. Each barrier of the plurality of barriers may extend outward from a different polygonal edge of the tessellation of polygons. The plurality of barriers may be composed of the support material.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
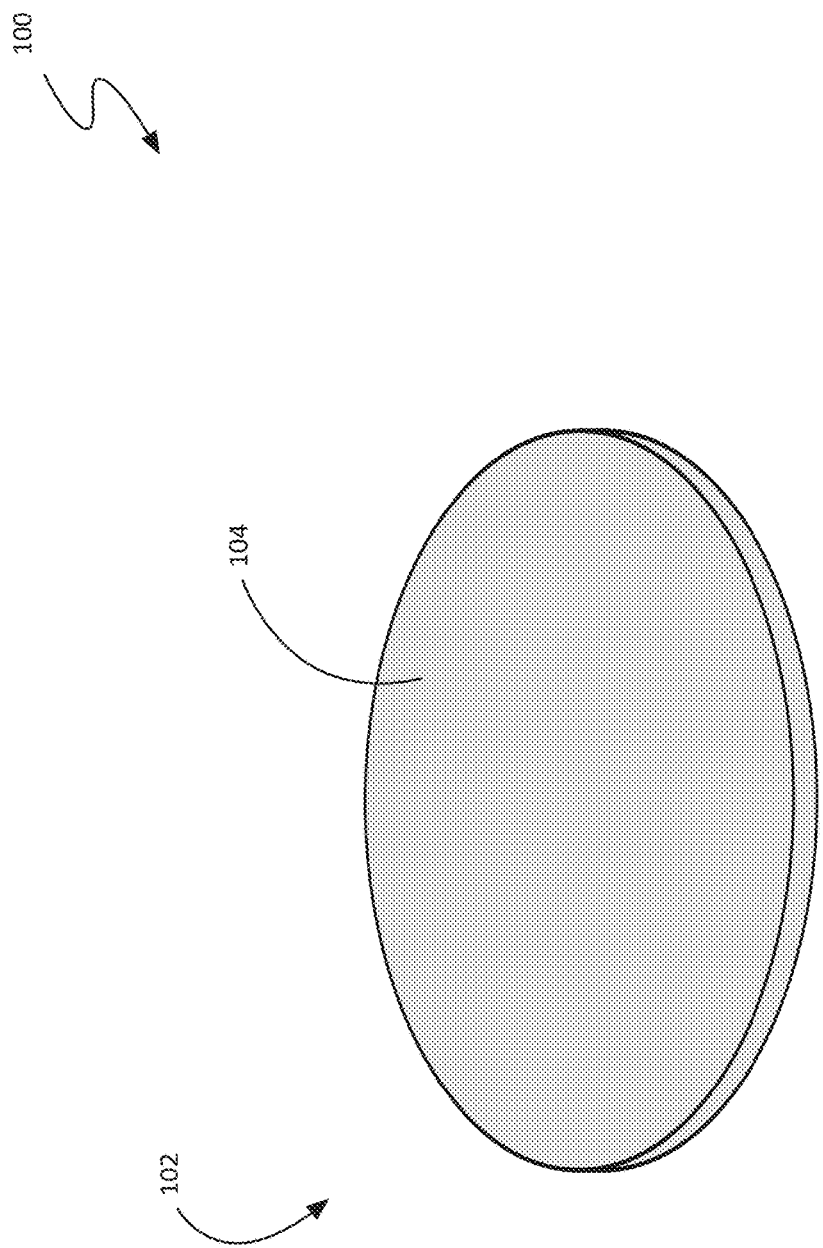
FIG. 1 is a perspective view of an enhanced capture structure with a flat sheet architecture.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric $CO_2$ collectors can quickly overrun a tight energy budget for drawing in and processing air in bulk.

A promising technology that is well adapted for capturing dilute atmospheric carbon dioxide in an energy efficient manner is passive direct air capture, or passive DAC, which is distinguished from other DAC technologies which require additional energy for the forced convection of air. Air contactor surfaces that comprise sorbent materials are exposed to passive atmospheric air flows, capturing carbon dioxide with the sorbent material to be released within an appropriate context for further processing, use, and/or storage. In some passive DAC solid sorbent contactors in which the sorbent is presented in horizontal planes with native wind flow through open gaps between these planes, $CO_2$ mass transfer into the sorbent occurs by diffusion vertically, perpendicular to the wind direction. Diffusion is much slower than convection.

In many cases, it may be advantageous to induce some turbulence across the capture surfaces so as to enhance transport into the depth of the sorbent material. In general, it is advantageous to create surface roughness that is designed to disrupt air side boundary layers and maximize transport of $CO_2$ to the surface itself. This is relevant for any solid sorbent direct air capture system, but particularly important for passive systems relying on wind as the air motive force. However, surface characteristics which create turbulence also increase pressure drop and reduce air flow, which has the negative effect of reducing the amount of $CO_2$ presented to the sorbent. Therefore, there is a need for balancing these effects, and focusing the surface characteristics around improved mass transfer and minimized pressure drop.

Contemplated herein are enhanced capture structures for efficient and effective collection of atmospheric carbon dioxide as part of a direct air capture device. Specifically, contemplated herein are various enhanced capture structures (hereinafter structure) with various form factors, geometries, or shapes that manipulate the airflow/fluid dynamics at the interface between the sorbent material and the airflow. This results in the efficient capture of carbon dioxide when used to hold or structure sorbent materials for direct air capture. In some embodiments, the structure may be composed entirely of sorbent material(s), while in other embodiments, the structure may comprise a foundation or substrate of support material(s) to which one or more sorbent materials are applied. Those skilled in the art will recognize that these structures may make use of a wide range of sorbent materials, and the substrate may be chosen both for its mechanical and thermal properties, as well as its compatibility with the desired sorbent material and capture device. As will be discussed below, the contemplated structures, as well as the materials from which they are made, may be chosen to best fit the particular context in which it will be used (e.g., DAC device type, air flow type, environment, temperature swings, etc.).

According to various embodiments, the contemplated structures enhance $CO_2$ gas capture and release by manipulating the airflow at the air-sorbent interface and exceeding mass transport rates of diffusion in conventional planar configurations, particularly when enduring non-ideal conditions in the surrounding environment (e.g., temperature changes, etc.). This technology has potential applications as a component of a system for optimizing the removal of $CO_2$ from the surrounding environment of outdoors or indoors and even for breathable oxygen scrubbing (purification) in closed atmospheric environments, as well as converting the collected $CO_2$ into feedstock for other applications.

It should be noted that, while much of the following discussion is done in the context of sorbent materials for capturing carbon dioxide being utilized in a direct air capture device employing natural airflow for capture, the structures contemplated herein may be adapted for use with other capture methods and technologies, and may also be adapted for use with sorbent materials targeting gases other than carbon dioxide.

Sorbent materials used for direct air capture of $CO_2$ should be structured into a form that allows the best capture opportunity and characteristics for that particular sorbent material, for the flow of air, and for the environment the capture device is located within. Different sorbents have different molecular structures, and therefor may perform better when molded or manufactured into one geometry versus another. As a specific example, the performance of one sorbent may be optimal when it has very open paths while another sorbent might capture more efficiently in a more closed form. Other considerations are durability, the balance between performance of a particular geometry and its ability to withstand use in a particular environment (e.g., sorbent tiles apt to be battered by high winds vs. sorbent tiles in consistently mild conditions, etc.). Additionally, a capture structure geometry might suit one climate better than another. Because these capture devices may be used in a wide range of environments, and adapted to employ a wide range of sorbent materials, there does not tend to be a single form factor that is ideal for all cases.

According to various embodiments, the enhanced capture structures contemplated herein balance a number of conflicting considerations, including maximizing the density of active sorbent, maximizing the specific surface area of sorbent, and minimizing the thickness of a boundary layer at the surface of the structure without overly reducing the pressure. The contemplated structures can promote effective $CO_2$ mass transfer over a variable range of air velocities, especially for passive air capture systems. Other important form factor characteristics include, but are not limited to, a low thermal mass, temperature stability, chemical stability, the ability to freely drain liquid water, and macrostructural strength.

In some embodiments, the contemplated capture structures are enhanced with respect to both capture and regeneration operations. Regeneration may entail fluid dynamic considerations such as pressure change, temperature change, humidity change or a combination. Flow velocity will be inherently much lower. In some cases, heat transfer and liquid separation are important performance criteria which some of the contemplated structures enhance. In contactor systems in which the capture structure geometry is physically changed, such as collapsing into a smaller volume for part of the collect/release cycle, the architecture must also accommodate this new geometry. In some contactor designs, the flow direction may change between capture and regeneration modes. As a specific example, the fluidic flow may be substantially parallel to a planar capture structure plane (i.e., horizontal) during capture and perpendicular during regeneration. Advantageously, in some embodiments, the contemplated capture structures presents enhanced bidirectional mass transfer characteristics, according to various embodiments.

As a specific example, some embodiments of the contemplated capture structures may be adapted for use in a passive DAC system where capture occurs with natural air convection and regeneration is performed with forced convection by a sweep gas or induced flow. This provides an opportunity for the novel improvement of changing flow direction from across the surface of the capture structure with reduced pressure drop during capture, to perpendicular to the capture structure (e.g., flowing through it instead of along the surface, etc.) with higher pressure drop (i.e., lower speed) during regeneration. Some embodiments of the contemplated capture structure have an enhanced pressure drop bias in horizontal versus vertical flow directions.

FIG. 1 is a perspective view of a non-limiting example of an enhanced capture structure 100 with a flat sheet or planar architecture. As shown, the structure 100 comprises a sorbent structure 102 composed of a first $CO_2$ sorbent material 104. One of the simplest designs for a capture structure is that of a flat sheet. This geometry is analogous to conventional vapor-solid contacting devices which employ monolith sorbent geometry where the solid surfaces are parallel to the bulk vapor flow direction. However, in conventional flat structures, the $CO_2$ mass transfer into the sorbent occurs predominantly by diffusion perpendicular to the airflow over the surface. That diffusion is much slower than convection. According to various embodiments, the flat sorbent structures contemplated herein promote a much faster mass transfer into the sorbent material 104.

In the context of the present description and the claims that follow, a sorbent structure 102 is the portion of the enhanced capture structure that is, or gives shape to, the first $CO_2$ sorbent material 104. In some embodiments, including the non-limiting example shown in FIG. 1, the sorbent structure 102 may be free standing, composed entirely of the first $CO_2$ sorbent material 104. In other embodiments, the sorbent structure 102 may be a supported structure, where the first $CO_2$ sorbent material 104 is accompanied by a support material that possesses the needed properties (e.g., density, mechanical strength, etc.) to hold the first $CO_2$ sorbent material 104 in the desired shape. Various embodiments of the contemplated capture structures making use of support material will be discussed in greater detail with respect to FIGS. 2A and 2B, below.

According to various embodiments, the $CO_2$ sorbent material 104 is a solid sorbent that is able to capture and subsequently release carbon dioxide. As a specific example, in one embodiment, the $CO_2$ sorbent material 104 may comprise quaternary ammonium functionalized poly(arylene ether sulfone) with iodide counterion. The contemplated capture structures disclosed herein may be adapted for use with any solid sorbent material, with the caveat that the material possess the properties necessary to take on the desired shape or form. For example, some sorbent materials more amenable to melt processing, while others are more amenable to solution processing, each of which is better adapted for certain architectures.

According to various embodiments, the sorbent structure 102 (i.e., the flat sheet of FIG. 1) could be a sheet of polymer or a membrane. A membrane is solid and therefore prevents fluid dynamic transport between the two sides, across the membrane. In some embodiments, the sorbent structure 102 may be a membrane that is perforated, promoting fluidic coupling of the two sides. The shape and size of perforations may vary, according to various embodiments. One advantage of such coupling is that it can help mix air near the sorbent surface and thus accelerate air side transport.

In some embodiments, the sorbent structure 102 (i.e., the flat sheet of FIG. 1) may be a sheet of sorbent polymer. As an option, rather than employing the perforations used in the membranes, a cross flow may be generated by using an inherently open material. This includes woven or non-woven textiles, and may be flexible or rigid. Such open material embodiments will be discussed in greater detail, below.

While the flat sheet is a simple design, they can have thick boundary layers that inhibit convection near the surface, reducing the efficacy of the sorbent material 104. According to various embodiments, the air flow across a sheet-like sorbent structure 102 may be disrupted to accelerate air side transport through the resulting turbulence. The enhanced capture structures contemplated herein employ various methods to introduce turbulence near the sorbent surface and reduce the thickness of the boundary layer, mixing up the air and increasing the amount of $CO_2$ being supplied to the sorbent material 104. In some embodiments, including some of those discussed in the context of FIG. 1, these air flow disruptions may be caused by perforations or other small apertures. In other embodiments, a sheet-like sorbent structure 102 may be deformed to be less planar.

For example, in some embodiments, the sorbent structure 102 may resemble a pleated sheet. The surface area can be amplified by replacing flat sheets with pleated sheets. The fanfolds may be at various scales, and even at multiple scales, according to some embodiments. Fluid dynamic flow tends to slow down dramatically inside such structures. As a consequence, most of the transport would be accomplished by molecular diffusion. In some embodiments, the size of these stagnant or near stagnant zones may be on the order of a few millimeters, but less than 1 cm. Improvements in the performance parameters of the sorbent material 104 used may necessitate a reduction in the thickness of this layer. Furthermore, in some embodiments, pleated sheets may be structured in a very similar fashion as flat sheets, including perforations and material choices.

Figure 2A:
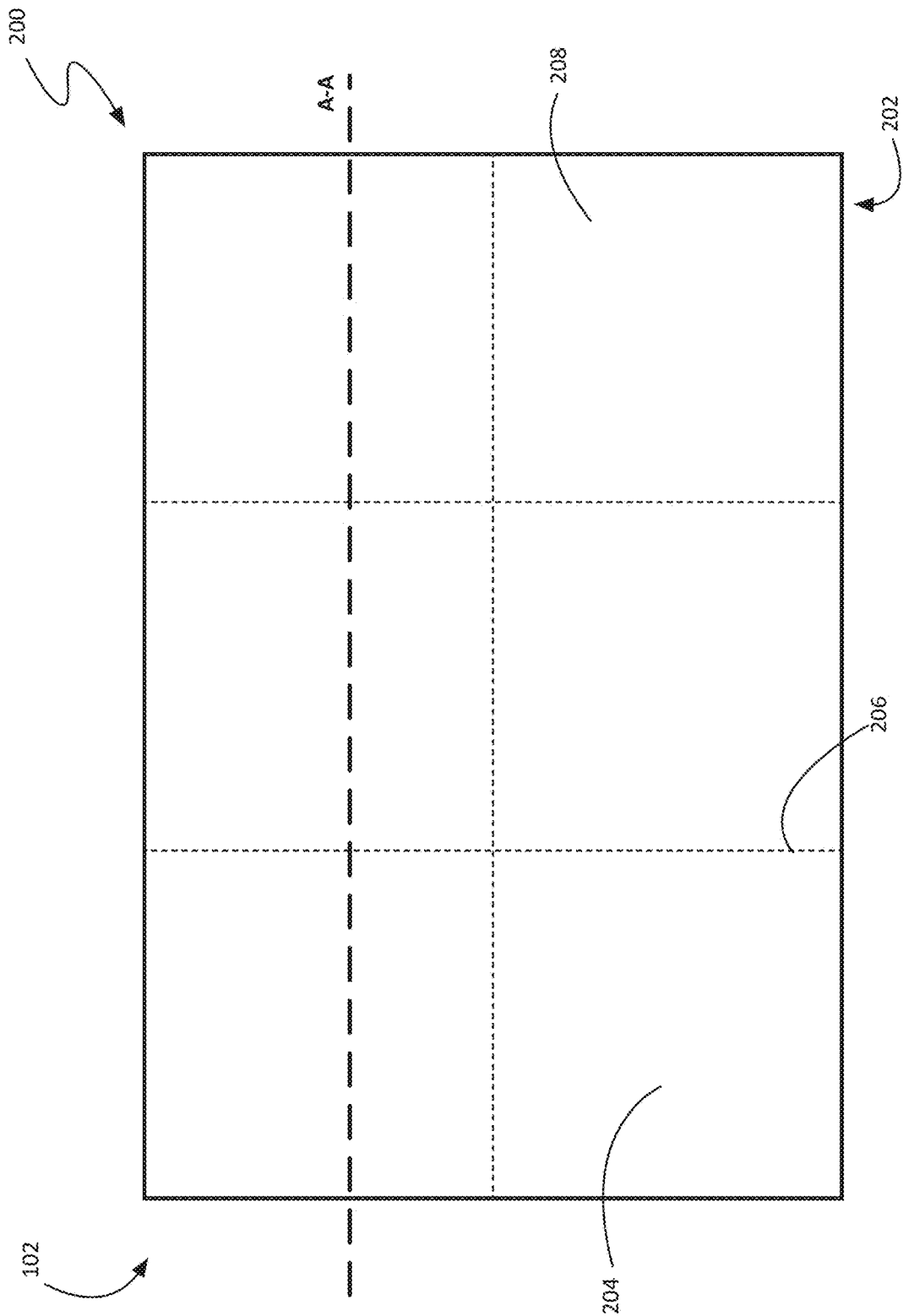
FIG. 2A is a top view of an enhanced capture structure with a quilted architecture.
Figure 2B:
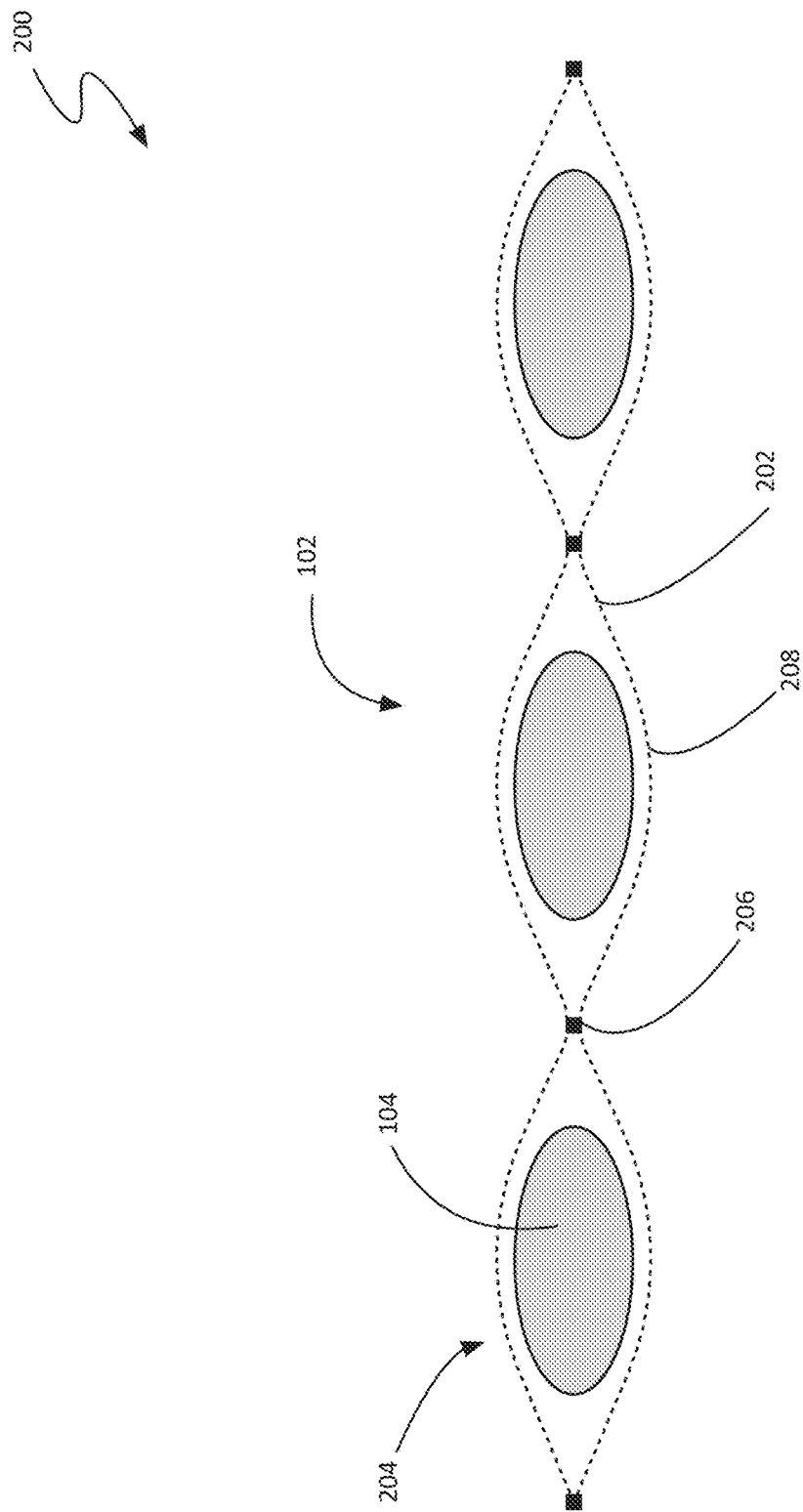
FIG. 2B is a cross sectional view along A-A of the enhanced capture structure of FIG. 2A.

FIGS. 2A and 2B show various views of a non-limiting example of an enhanced capture structure having a quilted or pocketed architecture. Specifically, FIG. 2A shows a top view of a non-limiting example of an enhanced capture structure 200, while FIG. 2B shows a cross-sectional view of the capture structure 200 of FIG. 2A along A-A. As shown, the contemplated capture structure 200 has a sorbent structure 102 comprising a sorbent material 104 and a support material 202. The support material 202 is formed to create a plurality of pockets 204 that partition and enclose the sorbent material 104.

According to various embodiments, the support material 202 used in the enhanced capture structure 200 with a quilted or pocketed architecture is able to contain the sorbent material 104 while also allowing the sorbent material 104 to be exposed to air flow passing directly through the pockets 204. For example, in some embodiments, the support material 202 may be a mesh material 208 having holes small enough to contain the sorbent material 104 and large enough to allow air flow. As a specific example, in one embodiment the sorbent structure 102 may comprise two sheets of mesh material 208, with the pockets 204 created by seams 206 (e.g., sewn seams, melted seams, adhesive seams, etc.) that join the two sheets together.

While the contemplated capture structure 200 having a pocketed architecture may be used with any solid sorbent material 104, it is particularly well adapted for use with sorbent materials 104 that are in the form of a powder (e.g., the support material 202 resembles the material used in single-serving tea bags, etc.). In some embodiments, the quilt-like support material 202 may be flexible (e.g., the support material 202 is a fabric), while in other embodiments, the pocketed sorbent structure 102 may be rigid (e.g., the support material 202 is a stiff plastic mesh, etc.).

As discussed above, in some conventional passive DAC devices, the sorbent is organized in horizontal planes with native air flows passing through open gaps between these planes. In such devices, $CO_2$ mass transfer into the sorbent material 104 occurs through vertical diffusion, perpendicular to the air flow direction. Diffusion is much slower than convection.

Turbulence can be introduced to the air flow passing over the sorbent surfaces, whether through random roughness in the material or through the deliberate inclusion of structure to disturb the air flow. This turbulence assists diffusion by disrupting the boundary layer, and in some cases may even induce some vertical convection, according to various embodiments (e.g., if the sorbent material 104 is porous, small pressure differentials form across the sorbent, etc.). This vertical convection significantly exceeds the mass transfer rates achievable through diffusion.

Some of the capture structures contemplated herein enhance this vertical convection through the use of sorbent structures 102 that create pressure differentials through the sorbent material 104. A very small pressure drop can have a large impact on overcoming mass transfer resistance, both in capture and regeneration modes.

Figure 3A:
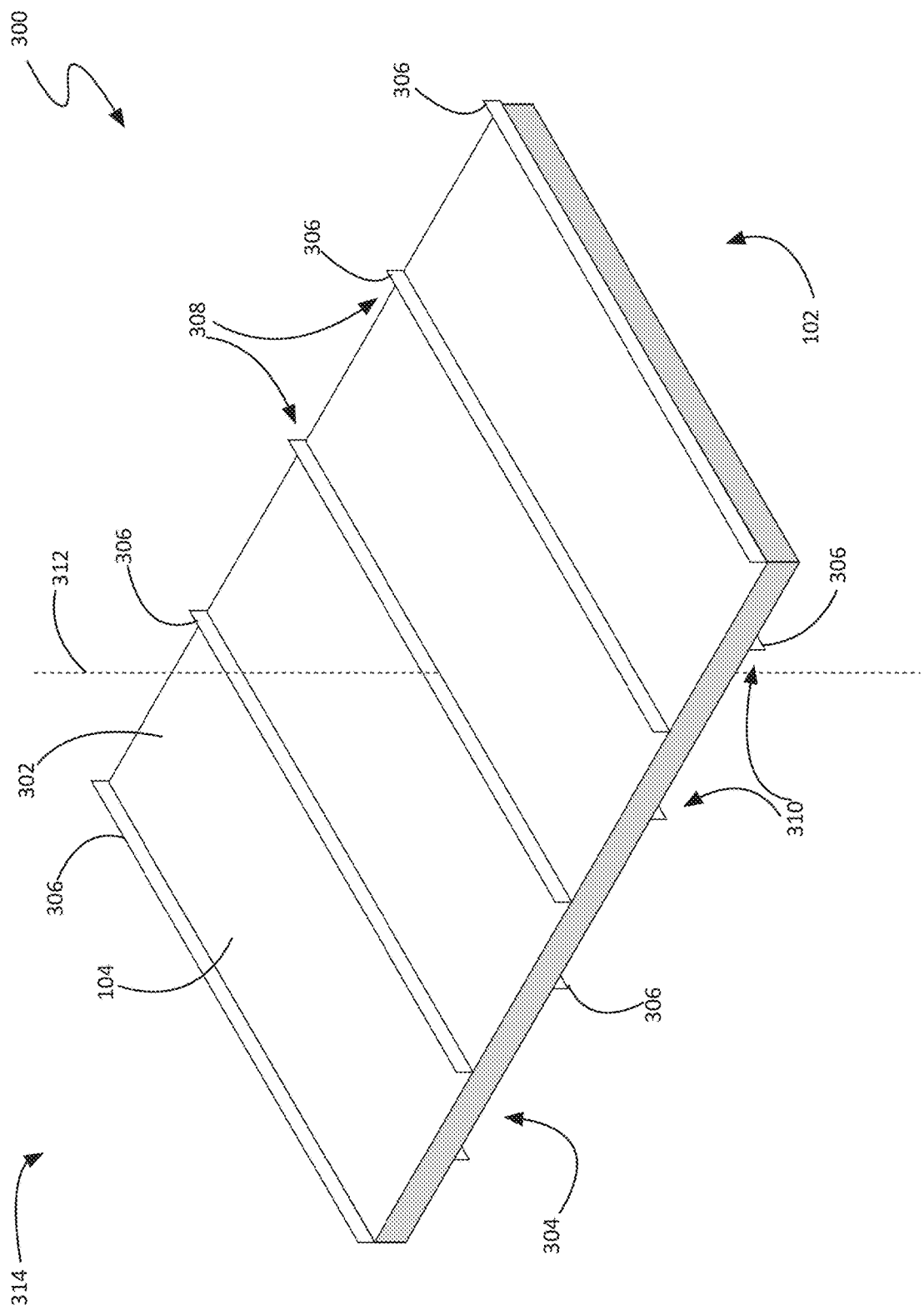
FIGS. 3A and 3B are perspective and top views of an enhanced capture structure with barriers.
Figure 3B:
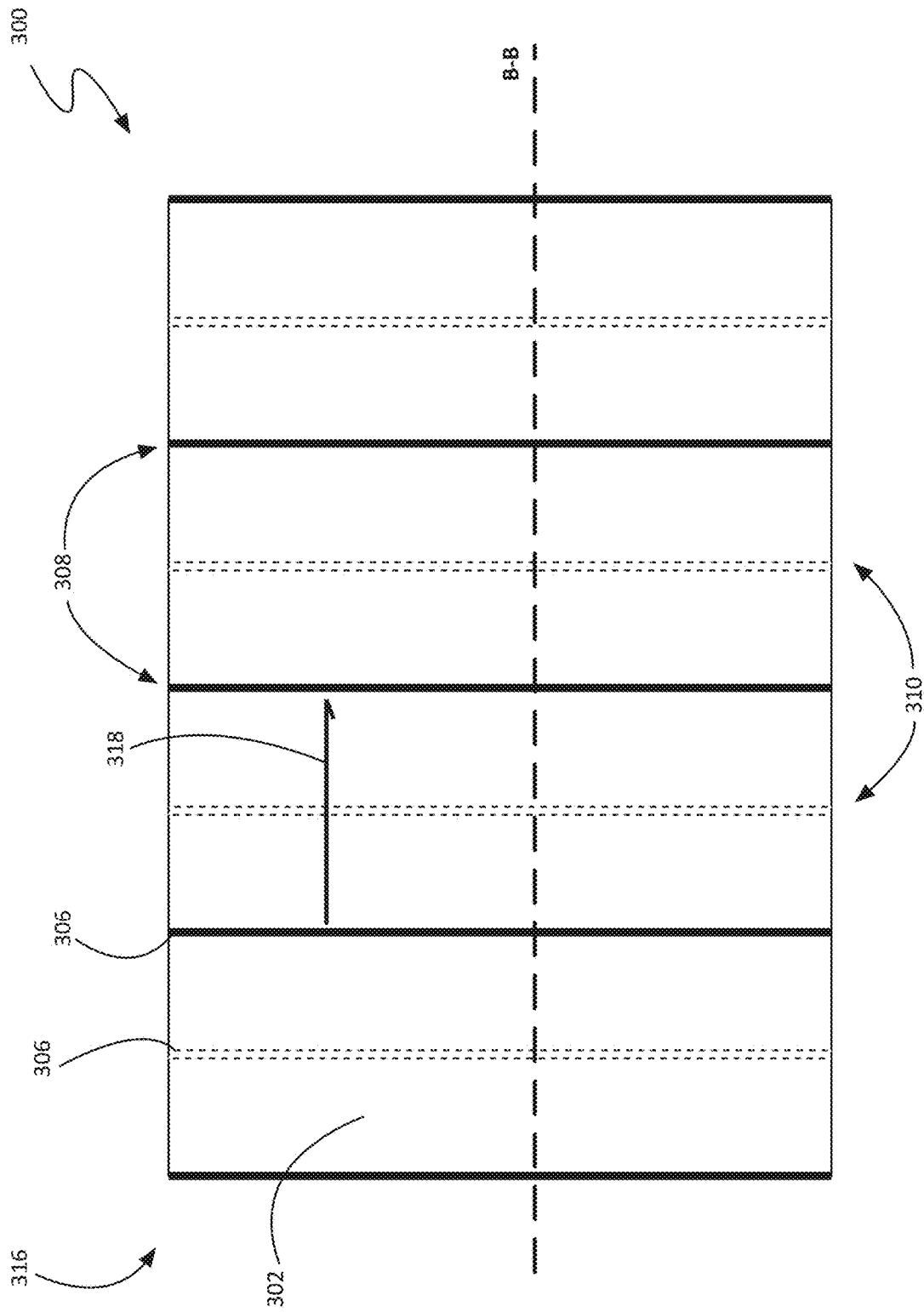
Figure 3C:
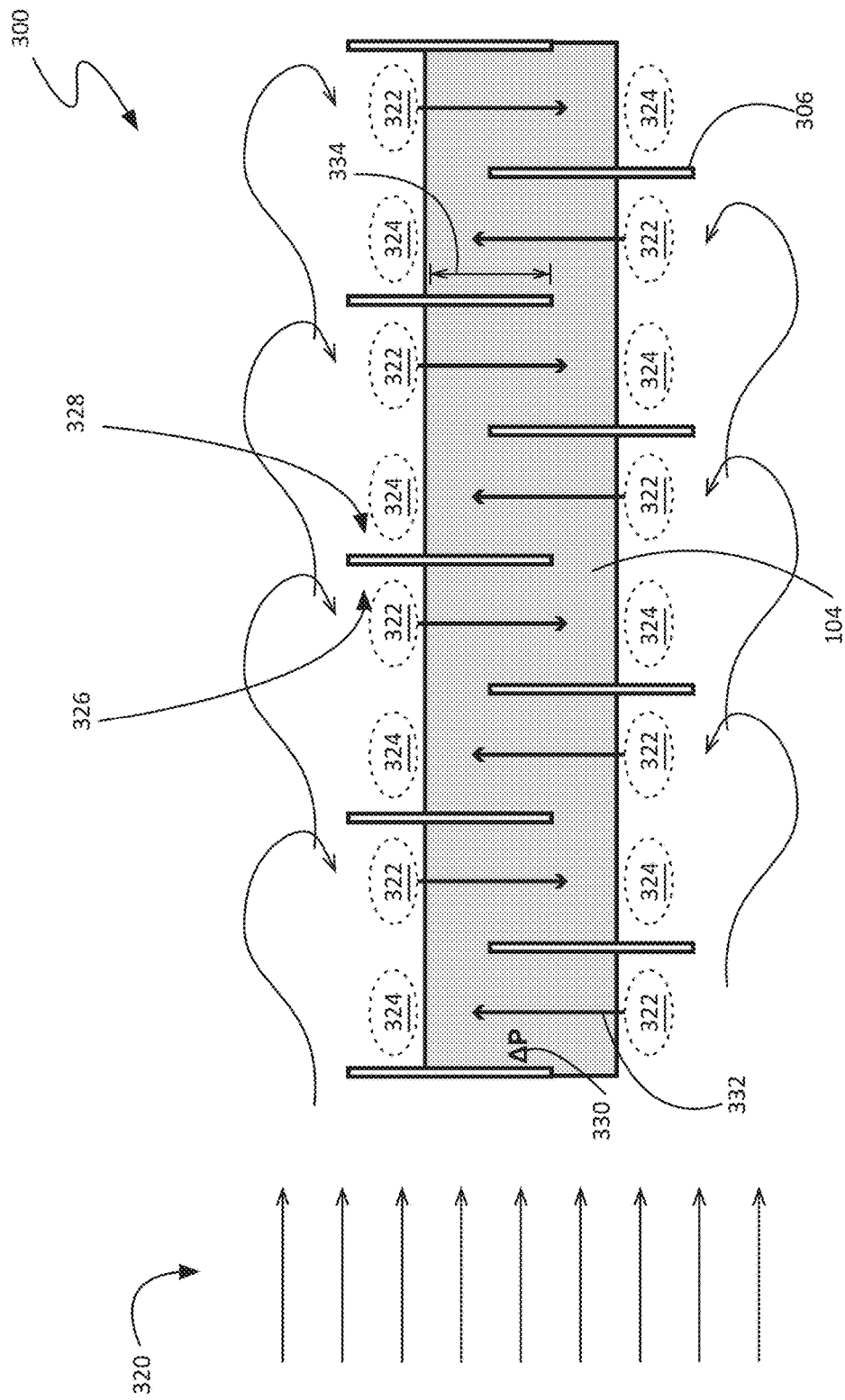
FIG. 3C is a cross sectional view along B-B of the enhanced capture structure of FIGS. 3A and 3B.
Figure 3D:
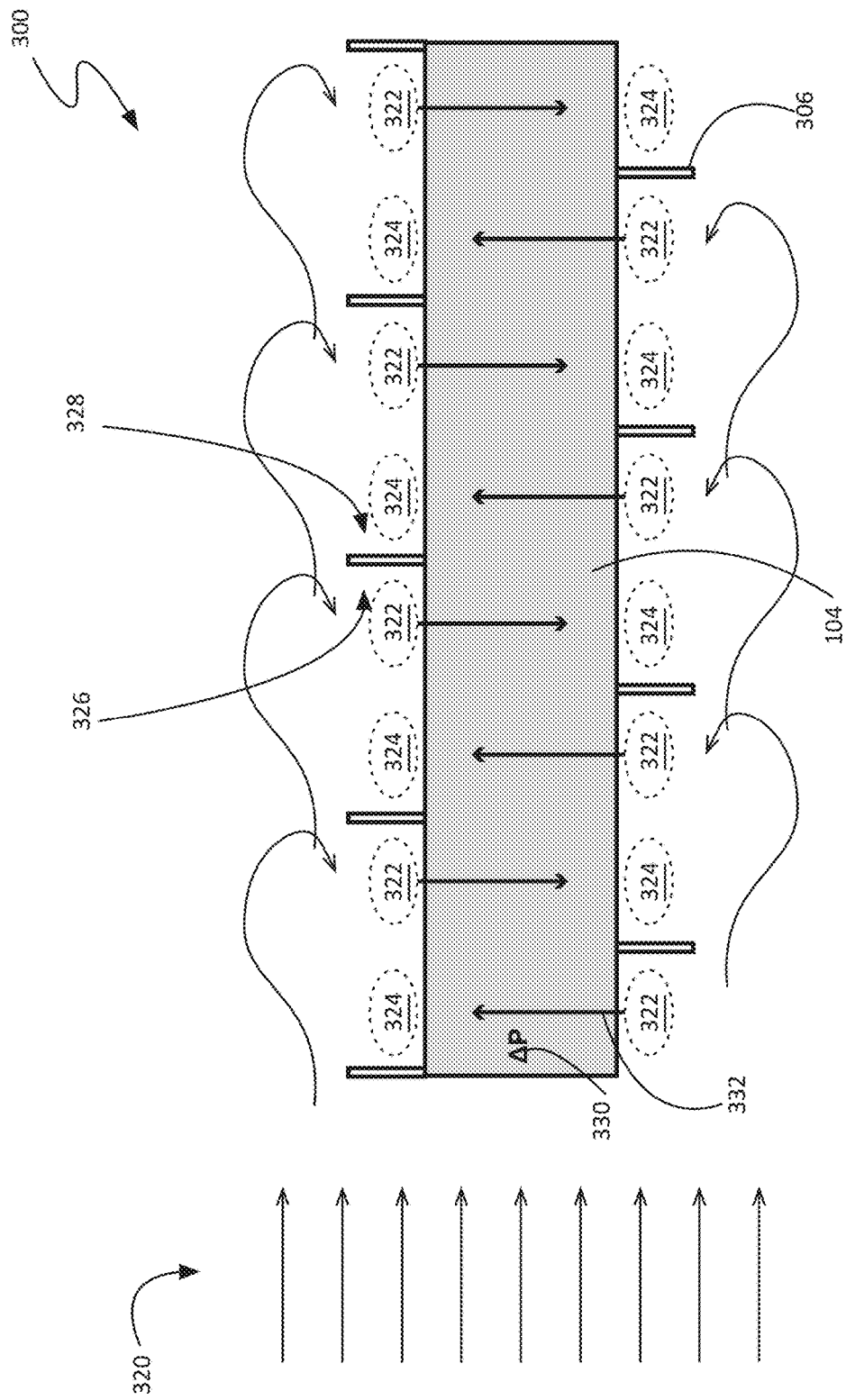
FIG. 3D is a cross sectional view along B-B of an embodiment of the enhanced capture structure of FIGS. 3A and 3B.

FIGS. 3A-3D show various views of non-limiting examples of an enhanced capture structure 300 with barriers 306. Specifically, FIGS. 3A and 3B are perspective and top views of a non-limiting example of an enhanced capture structure 300. FIGS. 3C and 3D are cross sectional views of two different embodiments of the non-limiting example of an enhanced capture structure 300 shown in FIG. 3B, taken along B-B. It should be noted that the relative dimensions of elements within these figures have been exaggerated for clarity, and that these representations are not to scale.

As shown, the contemplated capture structure 300 comprises sorbent structure 102 having a first surface 302 and a second surface 304 opposite the first surface 302, and a plurality of barriers 306 extending outward from the sorbent structure 102. In the context of the present description and the claims that follow, a barrier 306 is a structure, framework, or feature that extends outward from the sorbent structure 102 and creates turbulence in an airflow passing over the sorbent structure 102, disturbing the boundary layer. In some embodiments, a barrier 306 may be composed of a support material 202. In other embodiments, a barrier 306 may be integral with the sorbent structure 102, and may be composed of the sorbent material 104. This plurality of barriers 306 is divided into a first set 308 of barriers 306 extending outward from the first surface 302 of the sorbent structure 104, and a second set 310 of barriers 306 extending outward from the second surface 304. The first set 308 and the second set 310 are separated from each other by the sorbent structure 104, according to various embodiments.

In some embodiments, including the non-limiting example shown in FIG. 3C, each barrier 306 may pass through at least a majority 334 of the sorbent structure 102 In other words, in some embodiments the barriers 306 are partially embedded in the sorbent structure 102. As an option, in some embodiments the barriers 306 may pass entirely through the sorbent structure 102, from the first surface 302 to the second surface 304. In some embodiments, the barriers 306 may resemble strips that are partially embedded in the sorbent structure 102.

In other embodiments, including the non-limiting example shown in FIG. 3D, each barrier 306 may be coupled to a surface of the sorbent structure 102. Specifically, the barriers 306 of the first set 308 are coupled (e.g., bonded, adhered, etc.) to the first surface 302 of the sorbent structure 102, and the barriers 306 of the second set 310 are coupled to the second surface 304. While in some embodiments these barriers 306 may have a similar shape as the partially embedded barriers 306 (except shallower), in other embodiments different shapes may be used that provide manufacturing advantages. Since these barriers 306 are surface mounted, their height and thickness are similar in size, according to various embodiments (unlike the partially embedded barriers 306 which require extra height to rest beneath the surface of the sorbent structure 102). As a result, in some embodiments, the barrier 306 may be an off-the-shelf structure such as a round wire, or the like.

FIGS. 3C and 3D illustrate the consequences of the addition of the barriers 306 to the contemplated enhanced capture structure 300. According to various embodiments, each barrier 306 is sized and positioned with respect to the sorbent structure 102 such that as an airflow 320 passes along the sorbent structure 102 (i.e., along the first surface 302 or second surface 304) and over a barrier 306, the speed of the airflow 320 is manipulated. As the airflow 320 approaches a first side 326 (i.e., the side facing into the airflow 320) of a barrier 306, it is slowed down, creating a high pressure region 322 proximate the sorbent structure 102 and that first side 326 facing the airflow 320. As the airflow 320 moves past that barrier 306, it speeds up as it moves away. The faster flow creates a low pressure region 324 proximate the sorbent structure 102, on a second side 328 (i.e., the side facing away from the airflow) of that barrier 306. In some embodiments, the first side 326 is opposite the second side 328. Thus, the end result of the barriers 306 on a surface (e.g., the first surface 302) of the sorbent structure 102 is the formation of localized, alternating vertical pressure increases/decreases.

According to various embodiments, the positions of the barriers 306 of the first set 308 are staggered with respect to the positions of the second set 310, as shown in FIGS. 3A-3D. More specifically, in some embodiments, the positions of the barriers 306 making up the first set 308 and second set 310 are staggers such that an airflow 320 passing along the sorbent structure 102 (i.e., along the first surface 302 and second surface 304) creates a plurality of high pressure regions 322 and a plurality of low pressure regions 324 proximate the sorbent structure 102. According to various embodiments, the barriers 306 are positioned such that the high pressure regions 322 on one side of the sorbent structure 102 are opposite the low pressure regions 324, creating a plurality of pressure differentials 330 across the sorbent structure 102 (e.g., from the first surface 302 to the second surface 304, etc.). These pressure differentials 330 actively promote $CO_2$ mass transfer 332 into the sorbent material 104 via convection through the sorbent structure 102.

It should be noted that, in the context of the present description and the claims that follow, a high or low pressure region "proximate the sorbent structure 102" is close enough to the air-sorbent material interface of the sorbent structure that the change in pressure will result in a change in the degree to which that interface is exposed to carbon dioxide in the airflow 320.

According to various embodiments, in order for the pressure regions to line up and promote the desired vertical convection, the barriers 306 of the first set 308 cannot be directly across from the barriers 306 of the second set 310 (assuming that both sides of the sorbent structure 102 are experiencing the same airflow 320). In other words, in some embodiments (e.g., embodiments where the sorbent structure 102 is essentially planar, etc.), the first set 308 is asymmetrical to the second set 310, with respect to a mirror plane between and parallel to the first surface 302 and second surface 304.

Different embodiments of the enhanced capture structure contemplated herein may have sorbent structures 102 having varying degrees of symmetry, particularly with respect to features meant to manipulate boundary layer thickness, airflow speed, and the like. For example, in some embodiments of the capture structure, the sorbent structure 102 may have some degree of rotational symmetry 314 about an axis 312 that is normal to the first surface 302 and the second surface 304. The non-limiting example shown in FIG. 3A has second order rotational symmetry. Higher degrees of rotational symmetry may be advantageous in embodiments intended for use with natural, and thus unpredictable, airflows (e.g., airflows that may come from various directions). This will be discussed in greater detail with respect to FIG. 6, below. Lower degrees of rotational symmetry may make more efficient use of the sorbent structure 102 in cases where the airflow is almost always coming from the same direction. In some embodiments, the sorbent structure 102 may have translational symmetry 316 in a direction 318 that is parallel to the first surface 302 and the second surface 304 of the sorbent structure 102.

Figure 4A:
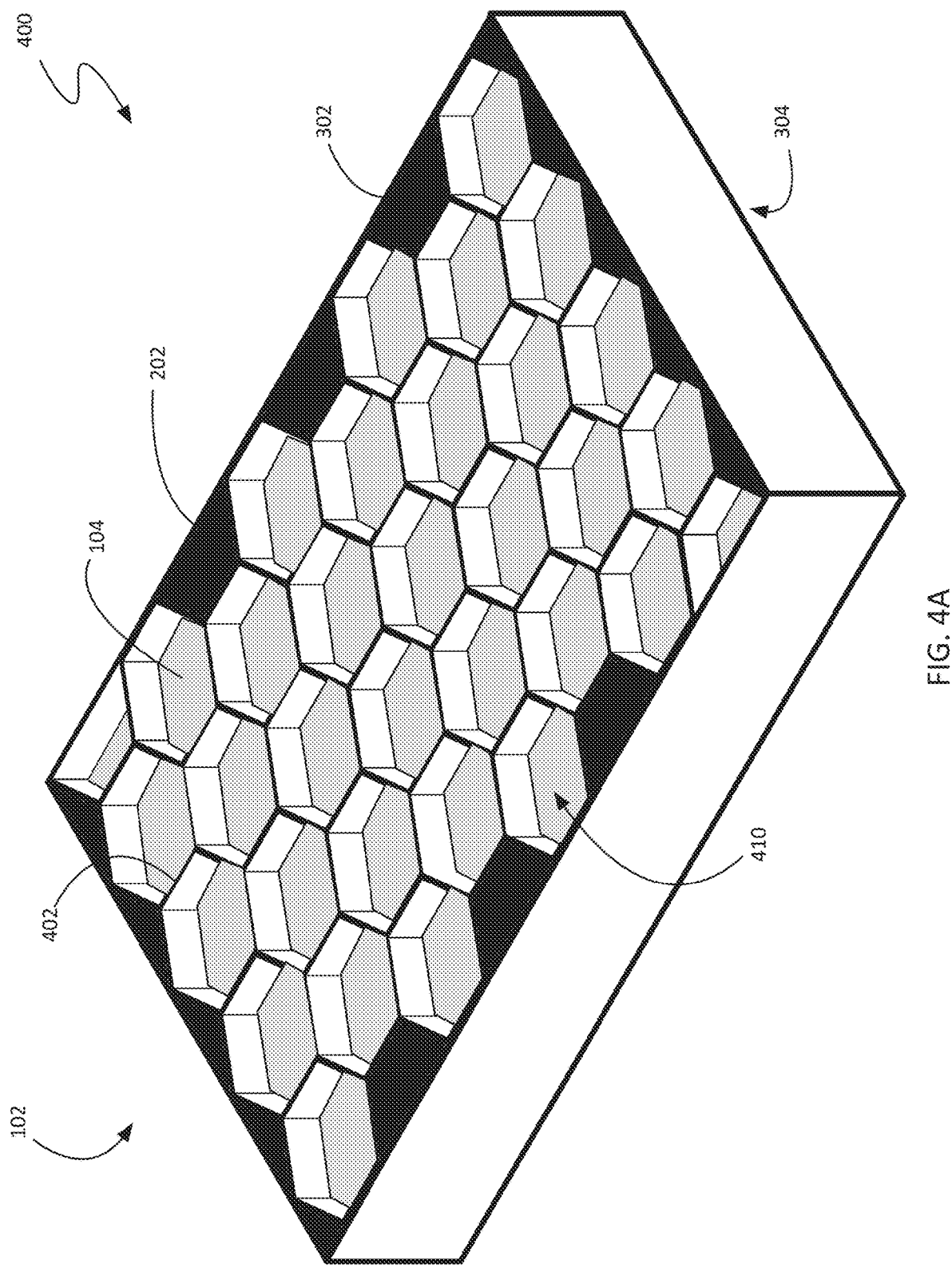
FIGS. 4A and 4B are perspective and top views of an enhanced capture structure with tessellated support.
Figure 4B:
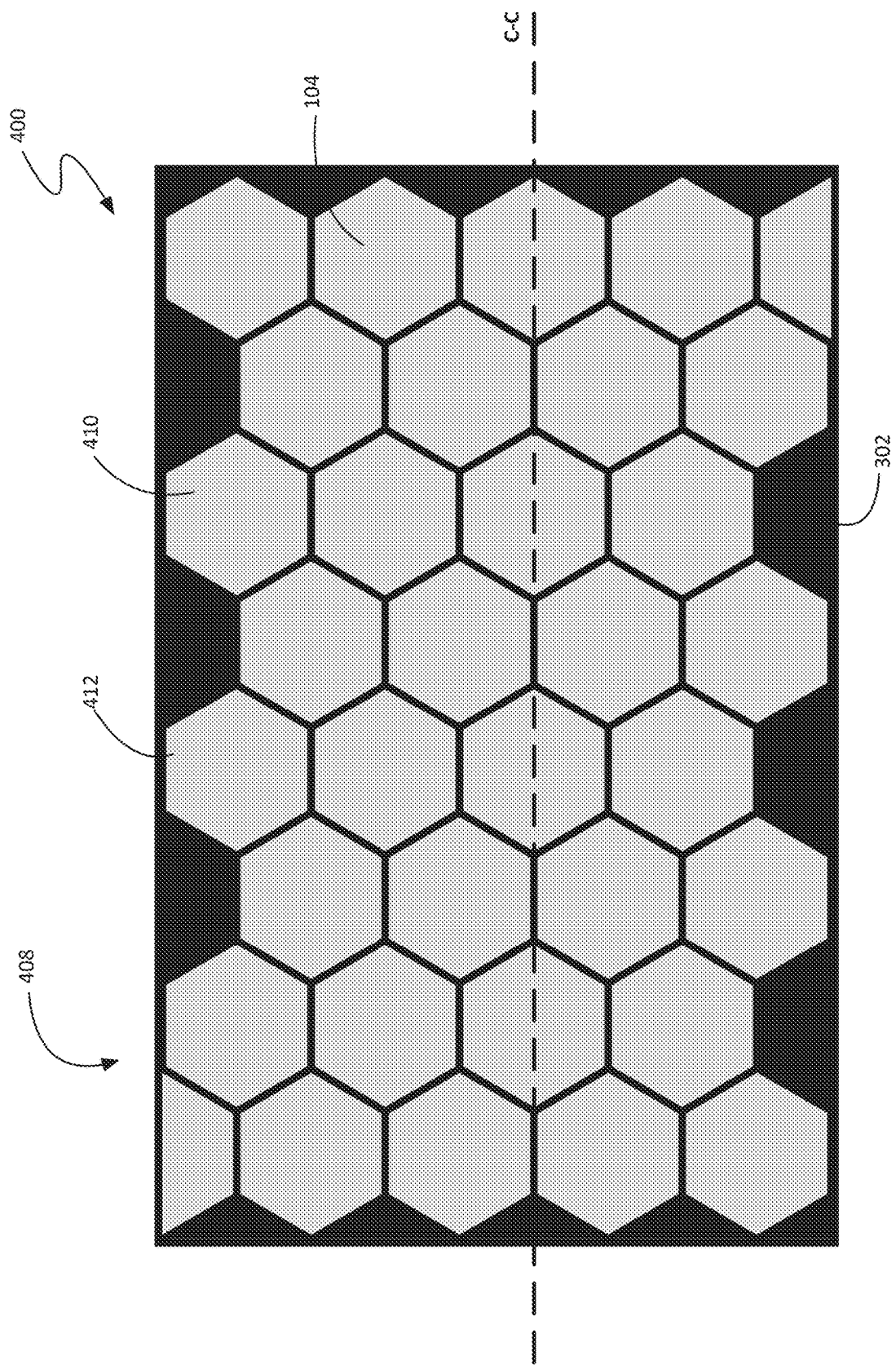
Figure 4C:
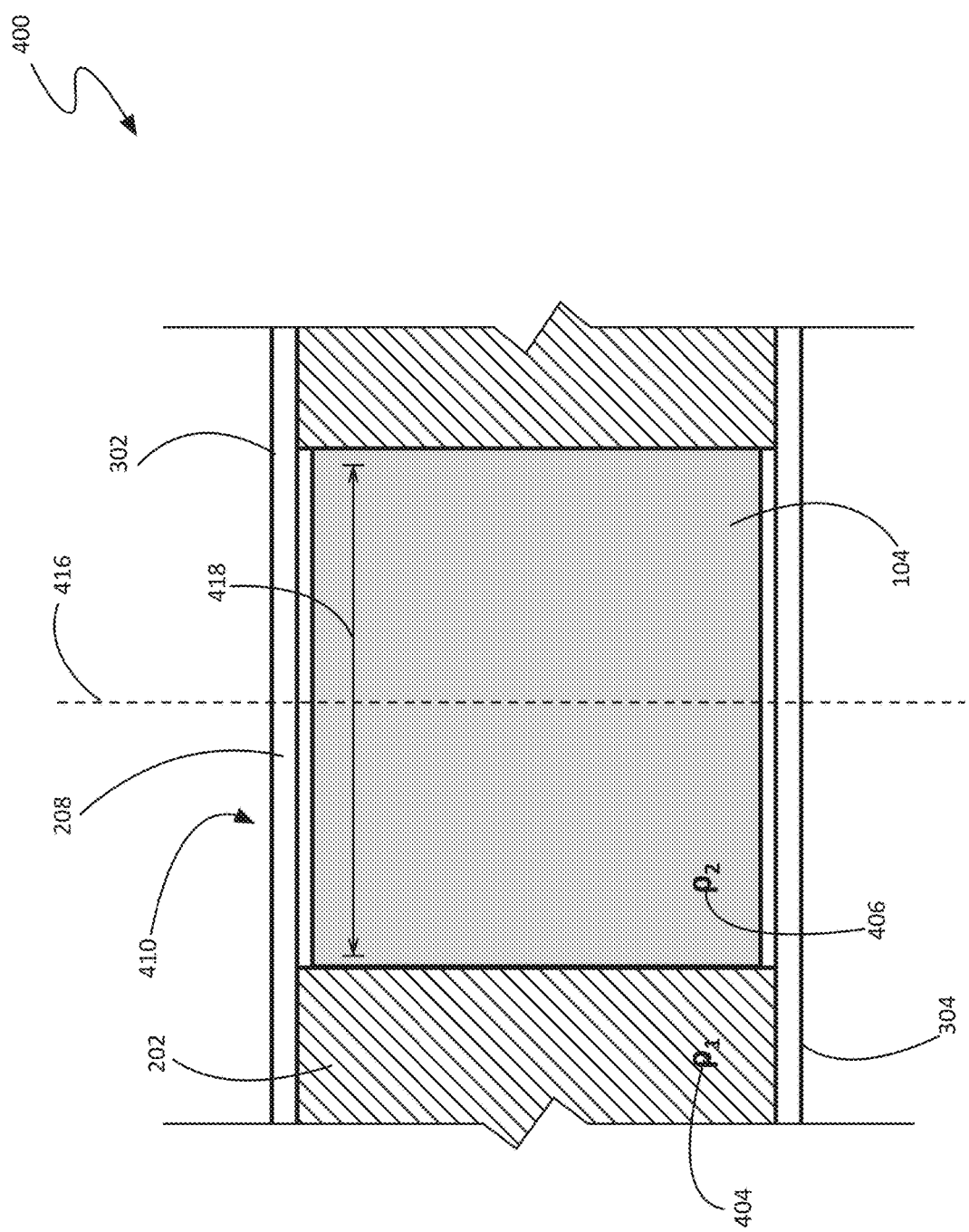
FIG. 4C is a cross sectional view along C-C of the enhanced capture structure of FIGS. 4A and 4B.

FIGS. 4A-4C are various views of a non-limiting example of an enhanced capture structure 400 having tessellated support. Specifically, FIGS. 4A and 4B are perspective and top views, respectively, of a non-limiting example of an enhanced capture structure 400 having tessellated support, and FIG. 4C is a cross-sectional view of that structure 400 along C-C of FIG. 4B. As shown, the capture structure 400 comprises a sorbent structure 102 comprising a first $CO_2$ sorbent material 104 and a support material 202. The support material 202 is organized as a tessellation 408 of polygons forming a plurality of polygonal conduits 410 passing from the first surface 302 to the second surface 304.

According to various embodiments, the first $CO_2$ sorbent material 104 is deposed within each polygonal conduit 410. In some embodiments, each conduit 410 is filled with the first sorbent material 104. In other embodiments, each conduit 410 is at least partially filled with the first sorbent material 104. Like the pocketed architecture, the contemplated capture structure 400 having a tessellated architecture is able to employ one or more sorbent materials 104 in powder, granular, or bead form, which can be difficult with many of the other architectures discussed herein. In some embodiments, both ends of the conduits 410 are closed after receiving the first sorbent material 104, using a material able to contain the sorbent 104 yet still permit air to pass through (i.e., a mesh material 208). It should be noted that the covering (e.g., mesh material 208, etc.) is only depicted in FIG. 4C, as it would obscure the tessellation 408 in FIGS. 4A and 4B.

This tessellated architecture may be thought of as an extension of the quilted or pocketed architecture discussed with respect to FIGS. 2A and 2B. However, unlike the pocketed architecture previously discussed, the contemplated capture structure 400 is a monolithic structure designed for airflow passing over the first surface 302 and second surface 304 of the sorbent structure 102 (i.e., perpendicular to the central axis 416 of a polygonal conduit 410 in the tessellation 408). This is in contrast with conventional vapor-solid contacting monolith structures in which the vapor flow direction and conduit central axes are parallel. As shown, each conduit 410 has a diameter 418 and a central axis 416 that is normal to the diameter 418.

According to various embodiments, the size (i.e., diameter 418) of the conduits 410 may be significantly smaller than the surface boundary layer thickness, meaning access to the interior surfaces of the sorbent structure 102 is mainly obtained by molecular diffusion. This is different from embodiments having the pocketed architecture, where the conduit 410 (or pocket 204) diameter may be comparable to or larger than the typical boundary layer thickness of air flow over a surface. According to various embodiments, the diameter 418 of a conduit 410 is chosen such that it is smaller than a boundary layer inherent to an airflow 320 over the sorbent structure 102 in a direction perpendicular to the central axis 416 of the conduit 410.

The tessellation 408 is formed with the support material 202. According to various embodiments, the support material 202 used in the contemplated enhanced capture structure 400 having a tessellated architecture may be any material sufficiently rigid as to maintain the tessellation 408. As a specific example, in one embodiment, the support material 202 is ABS plastic. In some embodiments of the enhanced capture structure, those having a tessellated architecture and otherwise, the support material 202 has a first density 404, and the first $CO_2$ sorbent material 104 has a second density 406 that is less than the first density 404. Furthermore, in some embodiments of the contemplated enhanced capture structure comprising a support material 202 and having any contemplated architecture, the support material 202 may comprise a second $CO_2$ sorbent material 402.

As shown, in some embodiments, the tessellation 408 of an enhanced capture structure 400 having a tessellated architecture may be based on hexagons (i.e., each polygonal conduit 410 has a hexagonal cross section 412). It should be noted that in other embodiments, the tessellation 408 may comprise other polygons that are amenable to tessellation. In some embodiments the tessellation 408 may be based on a single polygon of uniform size, while in other embodiments the tessellation 408 may comprise a plurality of polygons and/or a plurality of sizes.

As a specific, non-limiting example, in one embodiment, an enhanced capture structure 400 comprises support material 202 that is 110 mm by 110 mm by 10 mm, inside of which is a hexagonal tessellation, where each hexagonal conduit has a diameter 418 of 10 mm. In another embodiment, the overall dimensions are the same, but the diameter 418 is 5 mm, improving localized turbulence and air-sorbent contact, enhancing $CO_2$ adsorption kinetics.

Figure 4D:
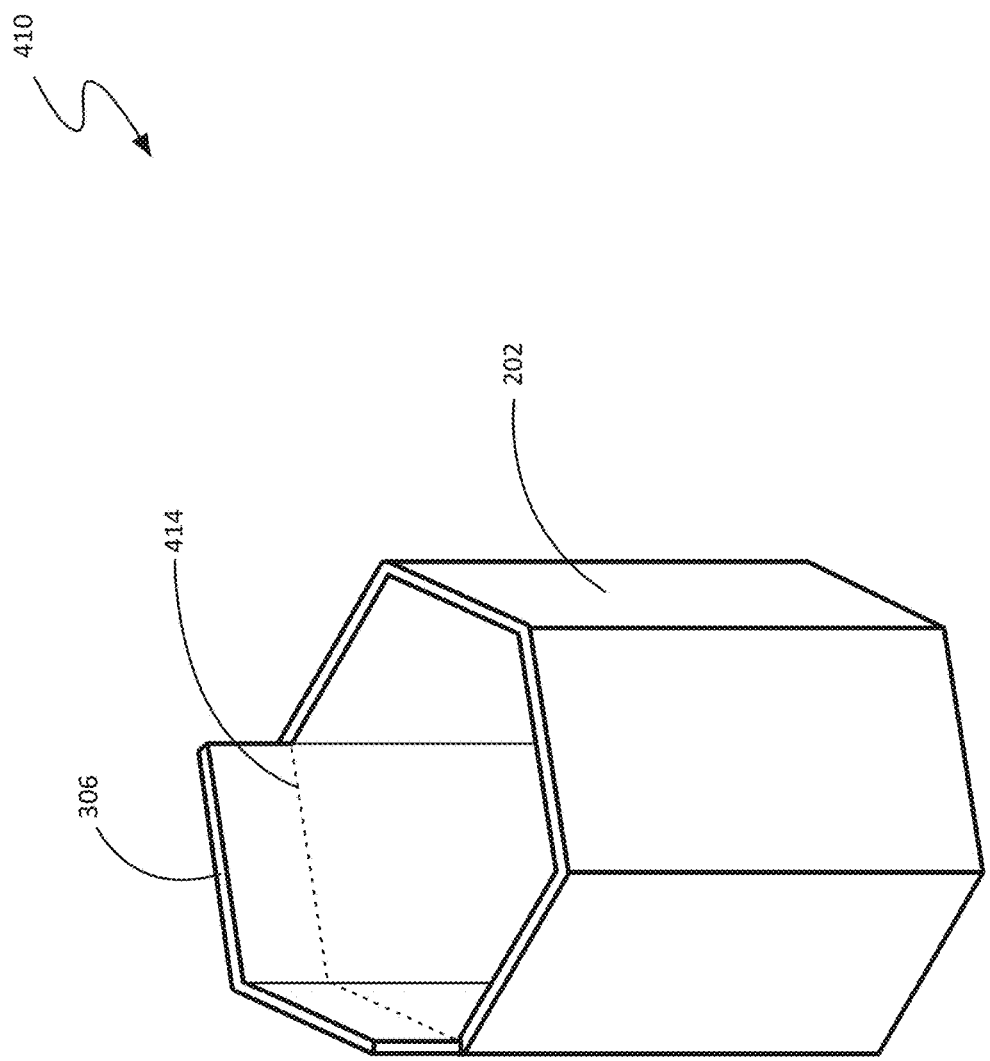
FIG. 4D is a perspective view of a single polygonal conduit having an integrated barrier from another embodiment of the enhanced capture structure of FIGS. 4A and 4B

In some embodiments, the enhanced capture structure may employ combinations of architectures. For example, in some embodiments, a tessellated architecture may be combined with turbulence-causing barriers 306. FIG. 4D is a perspective view of a non-limiting example of a single polygonal conduit 410 comprising a barrier 306. It should be noted that while a single polygonal conduit 410 is being shown in FIG. 4D, this should not be taken as a limitation. In some embodiments, conduits 410 may be fabricated individually and subsequently organized into a tessellation 408, while in other embodiments, the tessellation 408 may be formed together, with a plurality of polygonal conduits 410 integral with each other.

As shown, in some embodiments, a barrier 306 may extend outward from a polygonal edge 414 of a polygonal conduit 410. In some embodiments, the barrier 306 may be integral with the polygonal edge 414, while in other embodiments, the barrier 306 may simply be coupled to the edge 414. The combination of barriers with a tessellation may be advantageous, with both elements facilitating $CO_2$ mass transfer through the sorbent material 104 deposed within each conduit 410.

As previously discussed, sorbent structures 102 with flat, sheet-like surfaces can be accompanied by boundary layers with problematic thicknesses. Some of the contemplated capture structures use turbulence to disrupt this boundary layer. In other embodiments, the boundary layer problem is avoided all together by changing the dimensionality of the sorbent structure.

Figure 5:
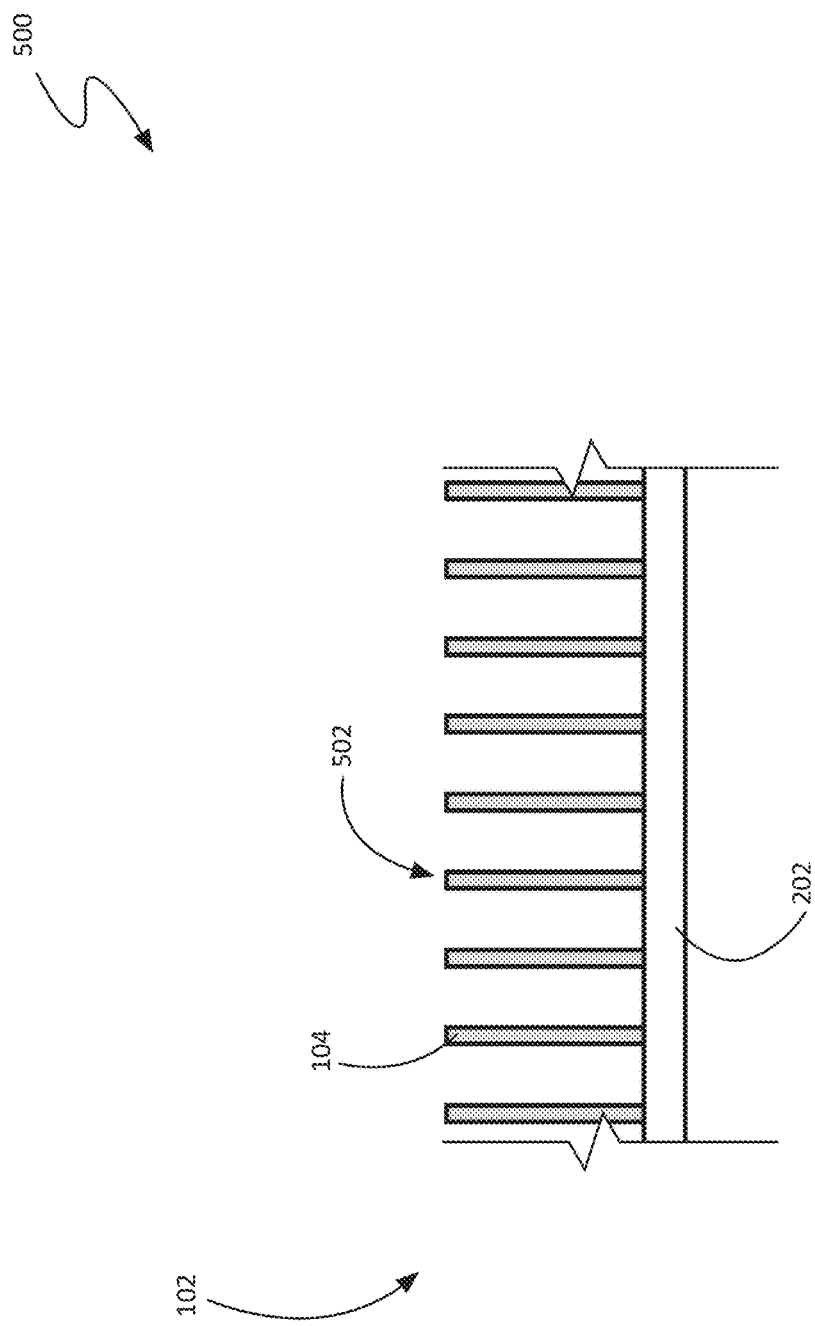
FIG. 5 is a side view of an enhanced capture structure with a brush architecture.

FIG. 5 is a side view of a non-limiting example of an enhanced capture structure 500 with a brush-like architecture. As shown, the contemplated structure 500 comprises a sorbent structure 102 having a plurality of bristles 502, or bristle-like projections, consisting of the $CO_2$ sorbent material 104. According to various embodiments, the bristles 502 are supported by a substrate composed of support material 202. In some embodiments, the support material 202 may itself be a sorbent (e.g., a perforated sorbent membrane, etc.).

Thin filament structures have the advantage of being unable to support a boundary layer much larger than their width. So long as they are spaced far enough apart, the use of protrusion-based sorbent structures 104 increases the amount of $CO_2$ being exposed to the sorbent structure 104. However, the use of these sorbent filaments reduces the overall density of available sorbent. According to various embodiments, a balance may be struck, increasing the sorbent density by reducing the spacing while also adjusting the length of the bristles 502, which can appear more like stubble in some embodiments.

Another advantage of protrusion-based embodiments such as the brush architecture shown in FIG. 5 is that the sorbent material 104 extending out from the support material 202 (whether it be sorbent material or substrate) allow for 360 degree exposure to the airflow 320 around each protrusion. Such exposure is a critical factor in the effectiveness and efficiency of the sorbent structure. In some embodiments, these protrusions may also be on both sides of the support material 202, both top and bottom, to maximize the amount of air contacting sorbent.

The barrier architecture exemplified by FIGS. 3A-3D is a variation on the foundational flat sheet architecture, using barriers 306 that extend out from a planar sorbent structure 104 to disrupt the boundary layer and introduce turbulence. The non-limiting example of an enhanced capture structure 300 with a barrier architecture shown in FIGS. 3A-3D had barriers 306 with sharp features and angles, projecting out of the first and second surfaces at right angles. Another variation on the flat sheet architecture also employs surface topologies that introduce turbulence.

Figure 6:
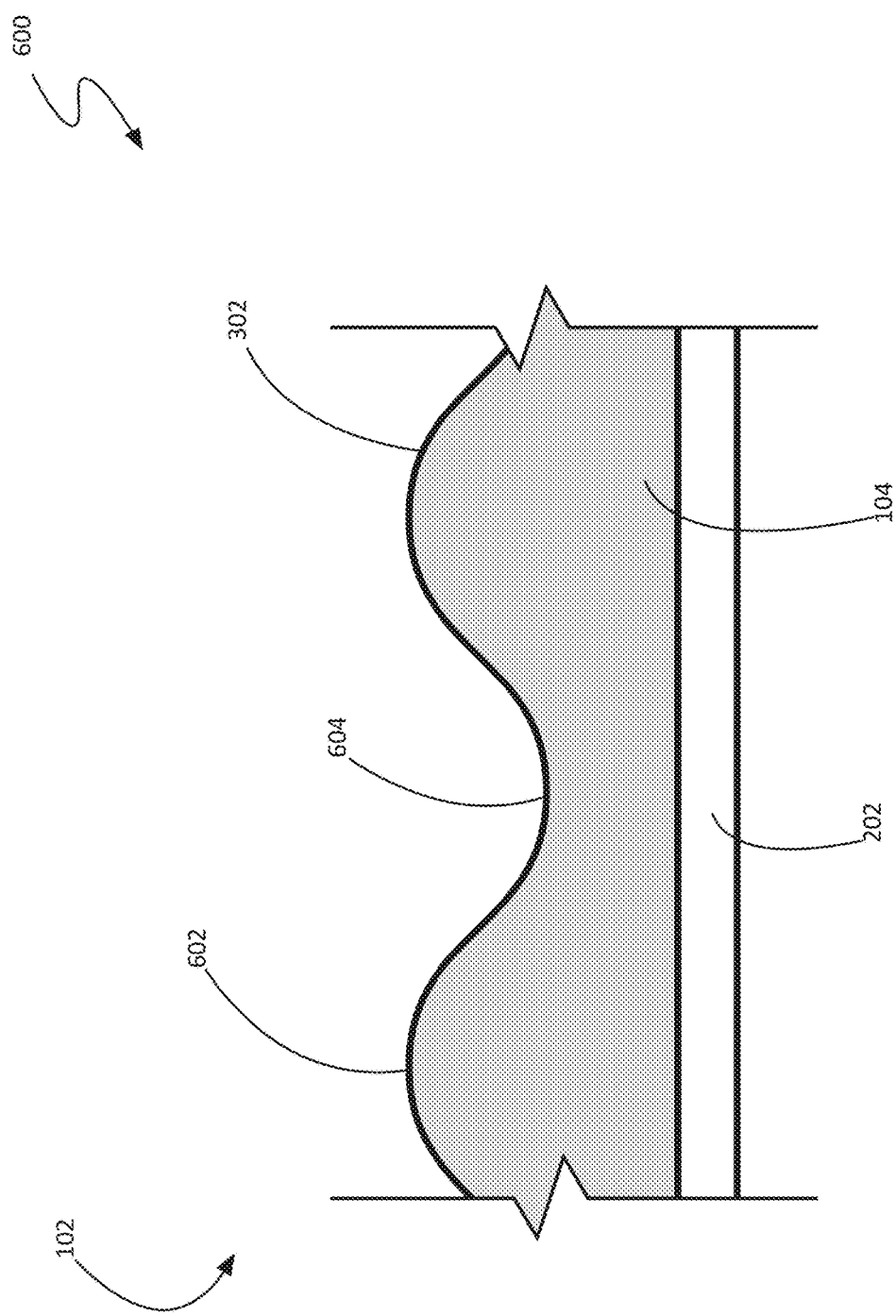
FIG. 6 is a side view of an enhanced capture structure with a wave architecture.

FIG. 6 is a side view of a non-limiting example of an enhanced capture structure 600 having a wave architecture. As shown, the capture structure 600 comprises a sorbent structure 102 having a sorbent material 104 that has been given a wave-like shape, alternating between wave crests 602 (i.e., peaks) and wave troughs 604 (i.e., valleys). According to various embodiments, this undulating surface adds planned structure for turbulence; as the air flows over the waves, it can "tumble" in a manner that is predictable, and thus can be exploited with other structural features that may facilitate mass transfer.

It should be noted that the non-limiting example shown in FIG. 6 is simple, for clarity. While it shows a repeating pattern of identical crests 602 and troughs 604, in other embodiments, the shaped surface(s) of the sorbent structure 102 may not be periodic. For example, in one embodiment where the airflow 320 comes from a predictable direction, the first surface 302 of the sorbent structure 102 may oscillate between crests 602 and troughs 604 having amplitudes that gradually get smaller and separations (i.e., wavelength) that progressively get shorter.

It should also be noted that while FIG. 6 shows a capture structure 600 with a single wave-like surface (i.e., the first surface 302), in other embodiments, the sorbent structure 102 may comprise shaped sorbent surfaces on both sides. In some embodiments, the shaped sorbent material 104 may be deposed on a substrate made of support material 202, while in other embodiments, the sorbent structure 102 may be free standing.

In some embodiments, this wave pattern may radiate from a central point on the sorbent structure 102. Such a configuration is advantageous for applications where the direction of the airflow 320 is unpredictable (e.g., natural air flows in an open space, etc.). In some embodiments, the shaped sorbent surface may resemble ripples in water after a stone is dropped in, and would disrupt the airflow in a predictable way, in all directions.

In other embodiments, including the non-limiting example shown in FIG. 6, the waves may be linear, propagating across a sorbent surface in a single direction, increasing the disruption to the air flow as it passes over the sorbent structure 102, but at the cost of being directional. This may be best applied in contexts where the DAC device is being used to capture $CO_2$ from an air flow having a predictable direction, whether due to external structures funneling it toward the device, or when the air flow is being driven by a blower or fan, rather than being atmospheric wind.

In some embodiments, a DAC may make use of multiple capture structures. In some cases, those capture structures may be chosen to handle airflows from multiple directions (e.g., all capture structures 600 are of the radial type, linear type capture structures 600 are arranged to propagate in different directions, etc.). It should be noted that these directional considerations may also be applied to capture structures having the pleated architecture discussed earlier, according to various embodiments.

In some embodiments, the sorbent material 104 may be deposed on support material 202 as a solid, monolithic piece having an advantageous shape (e.g., waves, bristles, etc.). For example, in some embodiments, the sorbent structure 102 may simply be a porous solid form with open passage for vapor diffusion and high specific surface area. This may resemble a foam. In other embodiments, the form factor of the sorbent material of the sorbent structure may be manipulated to enhance air turbulence, thus increasing mixing within the air flow and increasing the amount of carbon dioxide exposed to the sorbent surfaces.

Figure 7:
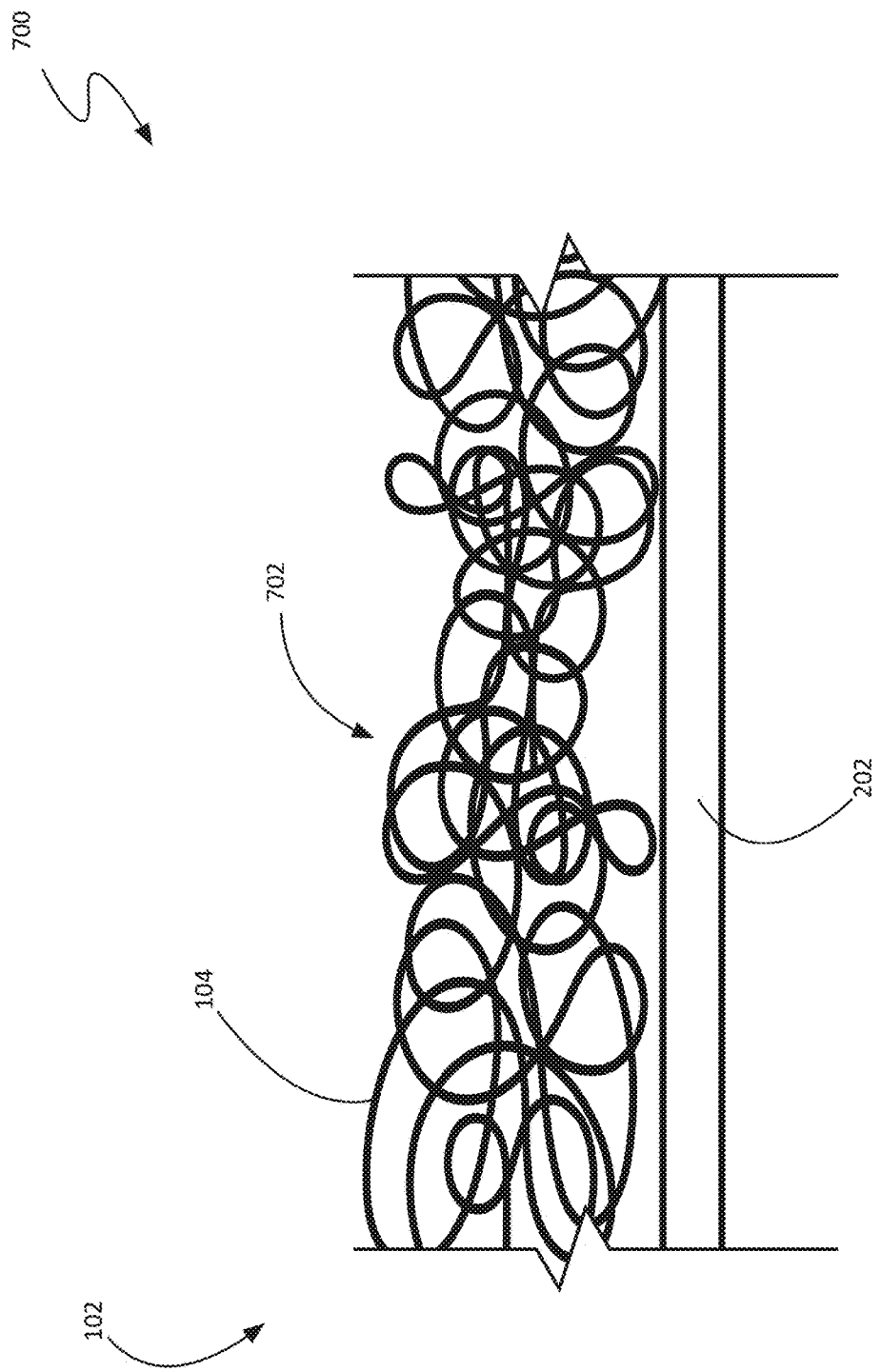
FIG. 7 is a side view of an enhanced capture structure with a spun fiber sorbent structure.

FIG. 7 is a side view of a non-limiting example of an enhanced capture structure 700 with a spun fiber sorbent structure. As shown, in some embodiments, the sorbent structure 102 may comprise sorbent material 104 that has been spun into fibers 702. As a specific example, in one embodiment the sorbent material 104 may be electrospun into fibers 702. These fibers 702 may have various geometries and arrangements, and may be applied to a substrate (i.e., support material 202) in a number of ways, perhaps best described in terms of a spectrum. At one end of the spectrum, long strands of sorbent fibers 702 may be deposed on the support material 202 in a free form, tangled manner, as shown in FIG. 7. In some embodiments, the fibers 702 may be attached by their ends to the support material 202, while in others they may hang from the support material 202.

In some embodiments, the sorbent fibers 702 may be straight, while in other embodiments they may be dendritic or tree-like in shape. In some embodiments they may curl and twist, able to be formed into a felt. In other embodiments they may more closely resemble grass or carpet. In still other embodiments, the fibers 702 may be hollow. In some embodiments, the sorbent material 104 itself may be formed into a fiber 702. In other embodiments, similar shaped structures may be fabricated with sorbent materials 104 not amenable to being spun by using a support material 202. For example, in one embodiment, a particulate sorbent material 104 is embedded in an extruded solid polymer melt (i.e., support structure 202).

Figure 8:
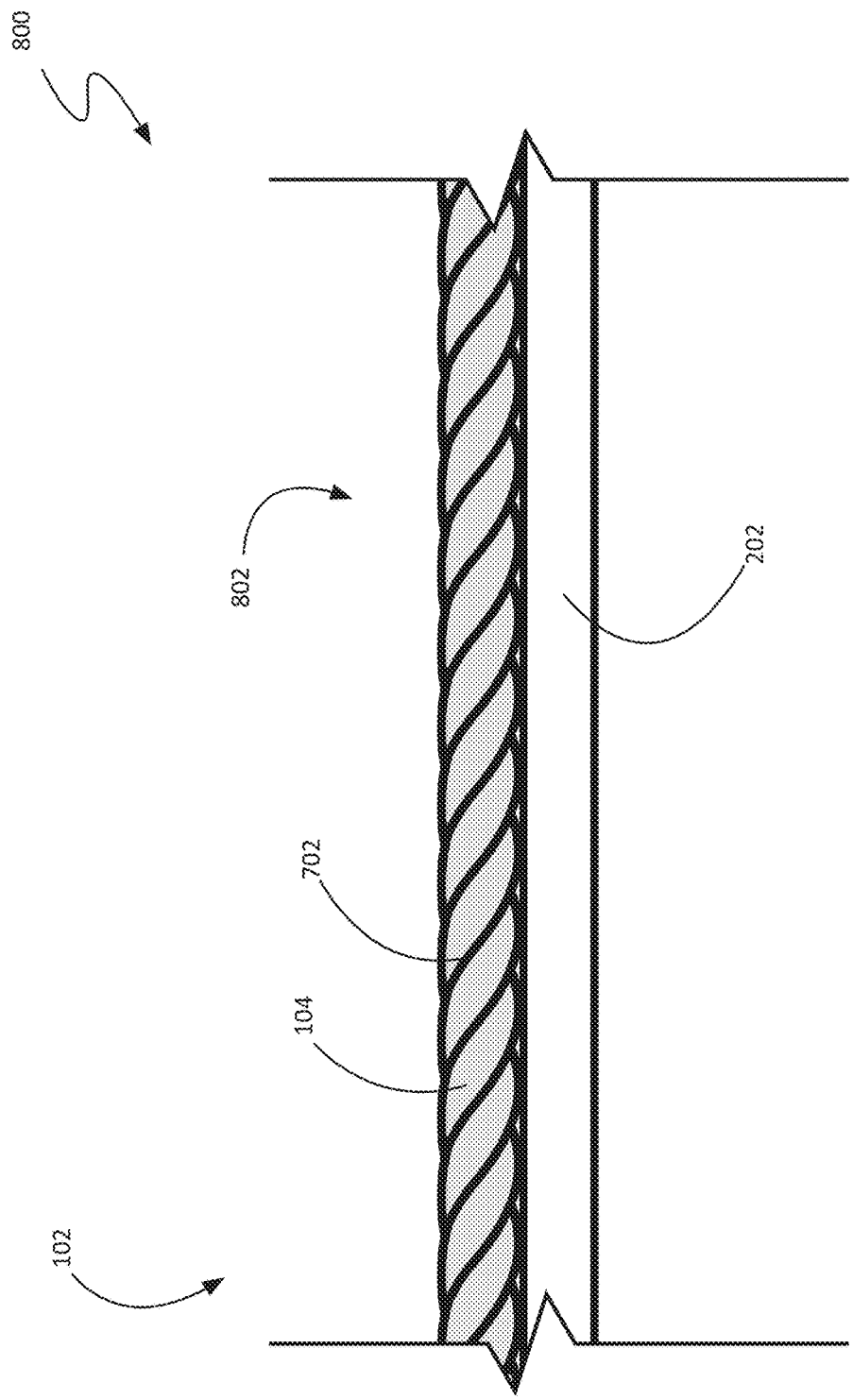
FIG. 8 is a side view of an enhanced capture structure with a woven rope sorbent structure.

Some embodiments may employ individual sorbent fibers 702. Other embodiments may increase the ordering of the sorbent fibers 702. For example, the sorbent fibers may be arranged in a pattern. FIG. 8 is a side view of a non-limiting example of an enhanced capture structure 800 with a woven rope sorbent structure 102. As shown, sorbent fiber 702 has been woven into a rope 802 that has been deposed on a substrate made of support material 202. Weaving the fibers 702 together into a rope 802 provides increased structure and mechanical strength. Like the spun fiber 702, the woven rope 802 provides for exposure, and adds an element of strength that allows for different applications of the enhanced capture structure 800.

Figure 9:
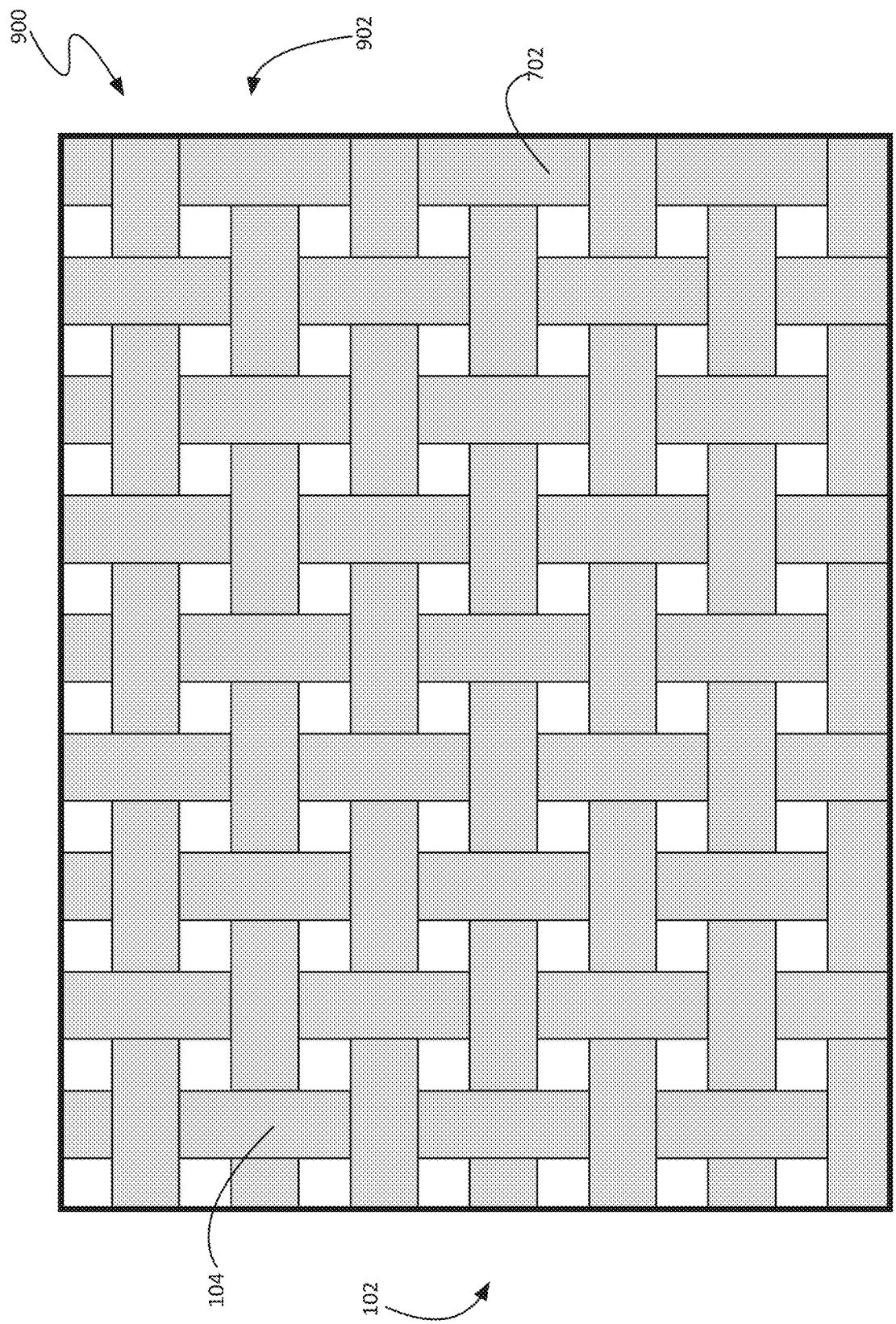
FIG. 9 is a top view of an enhanced capture structure with a woven mat sorbent structure.

FIG. 9 is a top view of a non-limiting example of an enhanced capture structure 900 with a sorbent structure 102 comprising a woven sorbent mat 902. Approaching the other end of the spectrum, in some embodiments, the fibers 702 may be woven into one or more mats 902, similar to woven "rag rugs", providing a partially open area of air flow and a structure to hold the sorbent 104 in place. These mats 902 may be woven tighter and tighter, and the openings made smaller and smaller, until this architecture approaches the perforated sheet/membrane discussed above.

It should be noted that, in some embodiments, the capture structure may have a combination of the geometries and architectures contemplated herein. For example, in one embodiment, the wave and pleated shapes may be combined. In another embodiment, the barrier architecture having a disrupting structure on the surface of the sorbent structure 102 may use a woven sorbent rope 802 as a barrier 306 in place of a wire or flat strip. In still another embodiment, the walls of a monolith may be polygonal conduits 410 from a tessellation 408. Those skilled in the art will recognize that these geometries may be combined in a large number of ways, which may be advantageous for particular use contexts.

As previously mentioned, given the staggering number of variations in sorbent and support materials, use environment, DAC devices and systems, there is no single capture structure that is preferred over all other in all cases. Some sorbent materials 104 are more amenable to one form of manufacturing or structure than another.

In terms of scale within the contemplated capture structures, there are several interconnected scale references. One is the distance between the surfaces. According to various embodiments, the feature size on a capture structure has to be small compared to the distance between said capture structures (e.g., tiles, plates, etc.). Another is the thickness of the sorbent structure 102 over which the air flows. This is often (but not always) relevant and typically would set a smaller scale.

According to various embodiments, the contemplated enhanced capture structures slow down the air by design. The thickness of that slow layer ideally is small enough so that the "airside resistance" does not overwhelm the resistance to transport in the porous or dense sorbent material 104. This limits the thickness. As a rough rule of thumb, the diffusion constant in air is on the order of $D=10^{-5}$ m$^2$/s, and the transport speed is $D/L$ where $L$ is this thickness. Transport rates are this speed times the concentration difference, which is low in air, according to various embodiments. For most sorbents, going past a few millimeters in boundary layer thickness starts to slow things down. The size of these structures can be a little larger, so much of it will play out on the centimeter scale, but in embodiments having hierarchical structures, things may play out on different scales. Pleats of a textile material may have roughness on different length scales. As a specific example, in one embodiment, the sorbent structure has a thickness (perpendicular to air flow direction) of 5-15 mm and an air flow path length (parallel to air flow direction) of <2 m.

Some embodiments having small apertures or perforations may comprise holes in the millimeter to centimeter range. However, it may also depend on how many such layers are being combined. Considerations include the planed flow velocity, number of layers, the geometry aligned to gain flow between the layers, and the like. The size of openings perpendicular to air flow may range from nanoscale for microporous materials to millimeters for macrostructures like honeycombs and pleats, according to various embodiments.

As previously mentioned, the enhanced capture structures contemplated herein are advantageously adapted for enduring non-ideal conditions in the surrounding environment, such as temperature change and wind velocity change. A temperature change will modify the configuration as material expands and contracts. One means of adjusting to such changes and maintain optimum production is to adapt the form to likely temperature oscillations. This is similar to the configuration of fill in cooling towers that is formed and arranged differently based on climate conditions, thus adjusting to heat, swings in weather, and freezing. Dynamic adjustment to ambient wind speed and direction can also be made, according to some embodiments. In one embodiment, the height of the vertical gap between horizontal capture structures may be dynamically adjusted larger or smaller as wind speed increases or decreases, in concert with sorbent form factor features designed to exploit these gap adjustments. In another embodiment, the sorbent structure 102 itself may be expanded or contracted. For example, a pleated sorbent form could be stretched or collapsed, changing both the spacing of vertical peaks presented nearly perpendicular to air flow direction and the path length of air flow.

Where the above examples, embodiments and implementations reference examples, it should be understood by those of ordinary skill in the art that other architectures, sorbent materials, and examples could be intermixed or substituted with those provided. In places where the description above refers to particular embodiments of enhanced capture structures, it should be readily apparent that a number of modifications may be made without departing from the spirit thereof and that these embodiments and implementations may be applied to other gas capture technologies as well. Accordingly, the disclosed subject matter is intended to embrace all such alterations, modifications and variations that fall within the spirit and scope of the disclosure and the knowledge of one of ordinary skill in the art.

What is claimed is:

1. An enhanced capture structure, comprising:
   a sorbent structure comprising a first $CO_2$ sorbent material, the sorbent structure further comprising a first surface and a second surface opposite the first surface; and
   a plurality of barriers extending outward from the sorbent structure, each barrier of the plurality of barriers sized and positioned such that as an airflow passes along the sorbent structure and over the barrier a high pressure region forms proximate the sorbent structure on a first side of the barrier facing into the airflow and a low pressure region forms proximate the sorbent structure on a second side of the barrier facing away from the airflow, opposite the first side;
   wherein the plurality of barriers comprises a first set of barriers extending outward from the first surface of the sorbent structure and a second set of barriers extending outward from the second surface of the sorbent structure, the first set of barriers staggered with respect to the second set of barriers such that the airflow creates a plurality of high pressure regions and a plurality of low pressure regions proximate the sorbent structure, where each high pressure region formed proximate one of the first surface and the second surface of the sorbent structure is opposite a low pressure region formed on the other of the first surface and the second surface of the sorbent structure, creating a pressure differential that promotes $CO_2$ mass transfer into the first sorbent material via convection through the sorbent structure.

2. The enhanced capture structure of claim 1, wherein each barrier of the plurality of barriers passes through at least a majority of the sorbent structure.

3. The enhanced capture structure of claim 1, wherein each barrier of the plurality of barriers is coupled to one of the first surface and the second surface.

4. The enhanced capture structure of claim 1, further comprising a rotational symmetry about an axis normal to the first surface and the second surface of the sorbent structure.

5. The enhanced capture structure of claim 1, further comprising a translational symmetry in a direction parallel to the first surface and the second surface of the sorbent structure.

6. The enhanced capture structure of claim 1, wherein the sorbent structure further comprises a support material having a first density, and wherein the sorbent material has a second density that is less than the first density.

7. The enhanced capture structure of claim 6, wherein the support material is a second $CO_2$ sorbent material.

8. The enhanced capture structure of claim 6, wherein the support material is a tessellation of polygons forming polygonal conduits passing from the first surface to the second surface, each polygonal conduit being at least partially filled with the first $CO_2$ sorbent material.

9. The enhanced capture structure of claim 8, wherein the polygonal conduits of the tessellation each have a hexagonal cross section.

10. The enhanced capture structure of claim 8, wherein each barrier of the plurality of barriers is integral with, and extends outward from, a different polygonal edge of the tessellation of polygons.

11. An enhanced capture structure, comprising:
    a sorbent structure comprising a first CO2 sorbent material having a second density and a support material having a first density greater than the second density;
    wherein the sorbent structure further comprises a first surface and a second surface opposite the first surface;
    wherein the support material is a tessellation of polygons forming polygonal conduits passing from the first surface to the second surface, each conduit comprising the first $CO_2$ sorbent material; and
    wherein the support material is a second $CO_2$ sorbent material.

12. An enhanced capture structure, comprising:
    a sorbent structure comprising a first $CO_2$ sorbent material having a second density and a support material having a first density greater than the second density;
    wherein the sorbent structure further comprises a first surface and a second surface opposite the first surface;
    wherein the support material is a tessellation of polygons forming polygonal conduits passing from the first surface to the second surface, each conduit comprising the first $CO_2$ sorbent material; and
    a plurality of barriers extending outward from the sorbent structure, each barrier of the plurality of barriers sized and positioned such that as an airflow passes along the sorbent structure and over the barrier a high pressure region forms proximate the sorbent structure on a first side of the barrier facing into the airflow and a low pressure region forms proximate the sorbent structure on a second side of the barrier facing away from the airflow, opposite the first side;
    wherein the plurality of barriers comprises a first set of barriers extending outward from the first surface of the sorbent structure and a second set of barriers extending outward from the second surface of the sorbent structure, the first set of barriers and the second set of barriers staggered such that the airflow creates a plurality of high pressure regions and a plurality of low pressure regions proximate the sorbent structure, where each high pressure region formed proximate one of the first surface and the second surface of the sorbent structure is opposite a low pressure region formed on the other of the first surface and the second surface of the sorbent structure, creating a pressure differential that promotes $CO_2$ mass transfer into the first sorbent material via convection through the sorbent structure.

13. The enhanced capture structure of claim 12, wherein each barrier of the plurality of barriers passes through at least a majority of the sorbent structure.

14. The enhanced capture structure of claim 12, wherein each barrier of the plurality of barriers is coupled to one of the first surface and the second surface.

15. The enhanced capture structure of claim 12, wherein each barrier of the plurality of barriers extends outward from a different polygonal edge of the tessellation of polygons.

16. The enhanced capture structure of claim 12, wherein the plurality of barriers is composed of the support material.

* * * * *